United States Patent
Minor et al.

(10) Patent No.: US 6,485,809 B1
(45) Date of Patent: Nov. 26, 2002

(54) LOW STRESS TO SEAL GASKET

(75) Inventors: Raymond Bryant Minor, Elkton, MD (US); Kevin Edward Dove, Newark, DE (US); Ronald G. Egres, Jr., Newark, DE (US); Alexander Riedl, Dorfen (DE); Hirokazu Hisano, Ako (JP); David John Mills, Newark, DE (US)

(73) Assignees: W. L. Gore & Associates GmbH, Putzbrunn (DE); Gore Enterprise Holdings, Inc., Newark, DE (US); Japan Gore-Tex, Inc., Tokyo (JP)

( * ) Notice: Subject to any disclaimer, the term of this patent is extended or adjusted under 35 U.S.C. 154(b) by 0 days.

(21) Appl. No.: 09/372,122

(22) Filed: Aug. 11, 1999

(51) Int. Cl.$^7$ ............... B32B 3/02; F16J 15/00
(52) U.S. Cl. ........ 428/66.4; 277/407; 277/532; 277/540; 277/626; 428/64.1; 428/66.6; 428/66.7; 428/68; 428/71; 428/76; 428/316.6; 428/421; 428/422
(58) Field of Search ............... 428/64.1, 66.4, 428/66.6, 68, 66.7, 71, 76, 316.6, 421, 422; 277/935, 936, 944, 945, 946, 407, 532, 540, 626

(56) References Cited

U.S. PATENT DOCUMENTS 2,094,908 A  10/1937  Thrall ............ 288/33
2,342,647 A  2/1944  Denman ............ 288/33

(List continued on next page.)

FOREIGN PATENT DOCUMENTS

| EP | 0 143338 A2 | 6/1985 |
| EP | 0 352 608 | 1/1990 |
| EP | 0 365 871 | 5/1990 |
| EP | 0 465 092 | 1/1992 |
| EP | 0 661 336 A1 | 5/1995 |
| EP | 0 736 710 A1 | 9/1996 |
| EP | 0 860 207 | 8/1998 |
| GB | 2 094 908 A | 9/1982 |
| JP | 55072950 | 6/1980 |
| JP | JGU-105 | 12/1989 |
| JP | 4-331876 | 11/1992 |
| JP | JGP-328 | 8/1997 |
| JP | JGO-331 | 9/1997 |
| WO | WO 89/11608 | 11/1989 |

Primary Examiner—Nasser Ahmad
(74) Attorney, Agent, or Firm—Allan M. Wheatcraft

(57) ABSTRACT

A multilayer, unitary gasket including at least one inner layer of expanded PTFE disposed between a first substantially air impermeable outer layer and a second substantially air impermeable outer layer, and a substantially air impermeable region bridging the first and second substantially air impermeable layers. The inventive gasket forms a substantially air impermeable seal when compressed at low stress.

37 Claims, 13 Drawing Sheets

U.S. PATENT DOCUMENTS

| | | | |
|---|---|---|---|
| 2,599,767 A | 6/1952 | Long | 285/1 |
| 3,230,290 A | 1/1966 | Nelson et al. | 264/320 |
| 3,382,567 A | 5/1968 | Schaeffler | 29/522 |
| 3,442,520 A | 5/1969 | Kupchick | 277/169 |
| 3,597,566 A | 8/1971 | Johnson | 219/10.55 |
| 3,679,218 A | 7/1972 | Farnam | 277/233 |
| 3,697,348 A | 10/1972 | Farnam | 156/90 |
| 3,720,420 A | 3/1973 | Jelinek et al. | 277/180 |
| 3,743,305 A | 7/1973 | Berens et al. | 277/37 |
| 3,787,278 A | 1/1974 | Ready et al. | 161/159 |
| 3,843,139 A | 10/1974 | Messenger | 277/37 |
| 3,854,736 A | 12/1974 | Farnam | 277/204 |
| 3,863,936 A | 2/1975 | Farnam et al. | 277/166 |
| 3,926,445 A | 12/1975 | Farnam | 277/204 |
| 3,953,566 A | 4/1976 | Gore | 264/288 |
| 3,986,721 A | 10/1976 | Decker | 277/166 |
| 4,032,606 A | 6/1977 | Solomatin et al. | 264/22 |
| 4,042,747 A | 8/1977 | Breton et al. | 428/323 |
| 4,070,219 A | 1/1978 | Farnam | 156/192 |
| 4,082,893 A | 4/1978 | Okita | 428/376 |
| 4,187,390 A | 2/1980 | Gore | 174/102 R |
| 4,234,535 A | 11/1980 | Okita | 264/519 |
| 4,357,026 A | 11/1982 | Panchetti | 277/153 |
| 4,385,093 A | 5/1983 | Hubis | 428/316.6 |
| 4,406,770 A | 9/1983 | Chan et al. | 264/406 |
| 4,435,235 A | 3/1984 | Atkinson et al. | 156/62.2 |
| 4,487,421 A | 12/1984 | Housas et al. | 277/207 A |
| 4,560,714 A | 12/1985 | Gajria et al. | 523/409 |
| 4,587,003 A | 5/1986 | Tantram et al. | 704/412 |
| 4,676,515 A | 6/1987 | Cobb | 277/235 B |
| 4,688,805 A | 8/1987 | Crotti et al. | 277/84 |
| 4,900,629 A | 2/1990 | Pitolaj | 428/422 |
| 4,913,951 A | 4/1990 | Pitolaj | 428/76 |
| 5,072,952 A | 12/1991 | Werner et al. | 277/229 |
| 5,112,664 A | 5/1992 | Waterland, III | 428/76 |
| 5,160,773 A | 11/1992 | Sassa | 428/76 |
| 5,195,759 A | 3/1993 | Nicholson | 277/215 |
| 5,234,739 A | 8/1993 | Tanaru et al. | 428/131 |
| 5,476,589 A | 12/1995 | Bacino | 210/500.36 |
| 5,492,336 A | 2/1996 | Barna et al. | 277/1 |
| 5,494,301 A | 2/1996 | Hamilton et al. | 277/227 |
| 5,527,047 A | 6/1996 | Waterland, III | 277/204 |
| 5,551,706 A | 9/1996 | Barna et al. | 277/229 |
| 5,558,347 A | 9/1996 | Nicholson | 277/229 |
| 5,879,789 A | 3/1999 | Dolan et al. | 428/212 |

LOW STRESS TO SEAL GASKET

FIELD OF THE INVENTION

The present invention relates to gaskets and, more particularly, to a gasket that forms a seal under less stress than required with existing gaskets.

BACKGROUND OF THE INVENTION

A wide variety of gaskets are known for use in sealing applications. Expanded polytetrafluoroethylene (PTFE) is widely used today as a gasket material. As disclosed in U.S. Pat. No. 3,953,566 to Gore, this material has numerous properties making it highly desirable as a gasket. These properties include being readily compressible and conformable, being chemically resistant, having relatively high strength, and being far less prone to creep and loss of sealing pressure than non-expanded full density PTFE alone.

In many sealing applications, the gasket is used to seal the junction between flanges, such as between pipes. In such applications, expanded PTFE is a desirable material for the gaskets because the expanded PTFE gasket can be placed between the flanges, and the flanges can then be pressed together with the application of force, such as by tightening of bolts. This application of force compresses the expanded PTFE. As the expanded PTFE is compressed, its initial pore volume is reduced, thus densifying the expanded PTFE. Particularly with metal-to-metal flanges, it is possible to apply sufficient force (or "stress") to the flanges to fully densify the expanded PTFE. Thus, in at least part of the expanded PTFE gasket, the pore volume is reduced to substantially zero, such that a fluid contained within the pipes is prevented from leaking between the flanges by the densified, non-porous PTFE gasket, which seals the flanges.

In many applications, particularly when harsh chemicals are used which would readily break down the metal or the metal could contaminate the chemical which is being transported or housed, it is common to use glass-lined steel, glass, or fiberglass reinforced plastic ("FRP") piping and vessels. Because this equipment is so often used with extremely harsh chemicals, there is great desire to use PTFE gaskets to seal the connecting flanges of this equipment because of the well known extraordinary chemical resistance of PTFE. Unfortunately, non-expanded full density PTFE gaskets are generally not conformable enough to effectively seal this type of equipment. In the case of glass-lined steel flanges, although there is a relatively smooth finish, there is often a large amount of unevenness or lack of flatness associated with the flanges. This unevenness or lack of flatness requires the gasket to have to conform to large variations around the perimeter as well as between the internal and external diameter of the flange in order to create an effective seal. Thus, a non-expanded full density PTFE gasket is not conformable enough to seal many of these applications.

Because expanded PTFE is so conformable, it would be desirable to use expanded PTFE to seal these commonly uneven flanges. Unfortunately, in many of these applications it is not possible to apply sufficient force to the flanges to create enough gasket stress to fully densify the expanded PTFE gasket to create an effective seal. For example, glass-lined steel piping flanges, glass flanges, or FRP piping flanges may deform, fracture, or break upon the application of a high amount of stress. Thus, in these applications, an expanded PTFE gasket may not be completely densified to reach a non-porous state, and therefore does not become leak proof, because the maximum stress that can be applied to the flanges without breaking them is not sufficient to so densify the gasket.

In many cases, it is not only necessary to be able to seal the actual fluid being housed or transported, but it is additionally necessary for the gasket to provide an air tight seal which can pass what is commonly known in the industry as a "bubble test". It is common to run this type of test as a pre-start-up qualifying test for checking for leaks in piping systems before allowing the system to be used in production carrying the actual fluid for which it was intended. In this test, the gasketed piping systems are pressurized with air and then sprayed with soapy water. The pipe and flange assemblies are visually checked for bubbles appearing in the soapy water indicating air leakage. All leakage sites must be eliminated to pass the bubble test.

Thus, what has been desired for many years is an easy-to-use highly chemically resistant gasket, which can effectively conform and provide an air tight seal for this equipment with the low loads or stresses that are available to create the seal.

There have been many attempts to provide a gasket that can effectively seal these difficult applications. Most of these attempts involve a two-piece gasket. These gaskets are commonly referred to as envelope gaskets. In most envelope gaskets, an outer envelope of PTFE is formed and is then separately filled with a more compressible filler material such as compressed asbestos or other felted gasket filler, an elastomer or plastic material, or a corrugated ring of metal, usually stainless steel. The basic concept is the PTFE jackets for the envelope gaskets provide chemical resistance while conformability is provided by the filler material.

Unfortunately, as explained in U.S. Pat. No. 4,900,629 to Pitolaj, envelope gaskets are subject to a number of disadvantages. The envelope jacket often will fold over on itself during installation of the gasket, thereby creating creases in the gasket that cause leaks. Also, there may be pin hole leaks in the envelope itself, causing corrosive material to attack the envelope filler resulting in degradation of the filler. When the filler degrades, sealing stress can be diminished, causing a leak to occur. Another problem, which can result, is that the degraded filler material can contaminate the fluids that were contained within the pipe or vessel. In some instances, the envelope jacket of PTFE will separate from the conformable filler material and ripples or folds may occur merely from stretching the envelope over the filler, again causing leaks to occur. Also, if uneven flange torquing occurs, the jacket may become overstressed and burst, once again allowing the corrosive material to attack the filler resulting in degradation of the filler and loss of the seal. Another problem is that these envelope gaskets are also subject to cold flow or creep, which requires periodic bolt retorquing.

In U.S. Pat. No. 5,195,759 to Nicholson, an envelope gasket is employed with a PTFE envelope within which is an elaborate metal filling consisting of wound or nested turns of thin metal strips perforated to provide resilience in the direction of their width. Individual turns can move or collapse to different extents, thereby accommodating lack of flatness of the surfaces to be sealed. Turns of fluid-impervious material may be distributed among the turns of the perforated strips. Although the gasket has some advantages, it still suffers from many of the disadvantages mentioned above associated with envelope gaskets, such as chemical attack of the metal filling under certain conditions.

In U.S. Pat. No. 5,558,347 to Nicholson, a gasket is disclosed comprising an envelope of chemically resistant PTFE and a metallic packing ring within the envelope is shaped to form cells. The cells may be filled with an inert gas under pressure so that increased loads on the gasket may be cushioned. Although this gasket also has some advantages, it still suffers from many of the same disadvantages mentioned above associated with envelope gaskets.

In Japanese Laid-Open Patent Application Number 4-331876 to Ueda et al., another envelope (jacket) gasket is proposed in which the outer periphery of a core composed of low-density porous PTFE that has been fibrillated (expanded) and has a density of 1.8 g/cc or less is covered with a sheath composed of high-density sintered PTFE. Although this gasket has the benefit of being 100% PTFE, and therefore does not suffer the chemical attack problems resulting from pinhole leaks in the outer envelope, it can still suffer from the aforementioned problem of the outer envelope or jacket folding over on itself during installation of the gasket, thereby creating creases in the gasket that cause leaks. It can also suffer from the aforementioned problem of the envelope jacket of PTFE separating from the conformable filler material creating ripples or folds that can result in leaks. Another problem with this gasket is that there is not a tight fitting contact between the envelope jacket and the inner porous PTFE core along the inner diameter of the gasket, thus leaving the envelope jacket without a backing in this area, and therefore more susceptible to damage during installation and while in use.

As mentioned in U.S. Pat. No. 4,900,629 to Pitolaj, in an attempt to rectify some of the problems associated with envelope gaskets, a homogeneous PTFE gasketing material filled with microbubbles (i.e., glass microballoons) was developed. This material, as illustrated by Garlock Style 3504 gasketing manufactured by Garlock, Inc. of Palmyra, N.Y., uses glass microballoons to impart compressibility (25% to 35%) to a PTFE binder, thereby providing a more deformable gasket without the disadvantages experienced by multiple component gaskets. This homogeneous PTFE/microballoon gasketing material exhibits enhanced compressibility and sealing characteristics due to the incorporation of microballoons, while maintaining the resistance to chemicals and the enhanced temperature characteristics provided by PTFE. However, the addition of the microballoons to the PTFE lowers the tensile strength properties that would be provided by pure PTFE gasketing. Plus, this gasket does not enjoy some of the aforementioned advantages that expanded PTFE has over non-expanded PTFE.

In U.S. Pat. No. 4,900,629 to Pitolaj, an attempt is made to overcome the inherent weakness of the homogeneous PTFE/microballoon gasket by loading more microballoons in the gasket surface layers, while leaving an unfilled PTFE center section. The microballoon filled layers are each formed to be within the range of from 20–25% of the overall thickness of the resultant gasket material, while the central PTFE section is within the range of from 50–60% of the overall gasket thickness. As explained in this patent, these ratios are important because if the outer surface layers are each formed to be below 20% of the overall gasket thickness, the finished composite sheet loses compressibility, while if they are formed to be above 25%, creep resistance and tensile strength are sacrificed in the finished product. Although this gasket is an improvement upon the homogeneously loaded microballoon gasket, and avoids the problems associated with envelope gaskets, it still does not adequately solve the problems of many applications. It is still left trying to trade off compressibility with creep resistance and tensile strength. This gasket also does not enjoy some of the aforementioned advantages of expanded PTFE compared to non-expanded PTFE.

In another attempt to rectify the two-piece nature problems associated with envelope gaskets, in U.S. Pat. No. 5,112,664 to Waterland, a unitary shielded gasket assembly is provided for use in corrosive environments having a synthetic rubber gasket as a core and a shielding material of expanded high density PTFE with an adhesive on at least one surface of the shielding material at least partially enveloping the surface of the core gasket. This gasket does not suffer from the wrinkles and folds that can result from a two-piece envelope gasket; however, it still suffers from the inherent problem of chemical attack problems resulting from pinhole leaks in the outer sheath.

In still yet another attempt to rectify the problems associated with envelope gaskets, in European Patent Application No. EP 0 736 710 Al, an annular gasket composed of porous PTFE for sanitary piping is proposed in which the surface layer of a gasket inner part directly contacting with sealed fluid is formed as a pore-free fused solidified layer. It is stated that the osmotic leak from the gasket inner part is prevented by the pore-free fused solidified layer formed in the gasket inner part although the gasket is composed of a porous material. Moreover, it is stated that since the fused solidified layer is formed only on the surface layer of the gasket inner part, the intrinsic properties of porous PTFE such as flexibility and affinity are not spoiled. This gasket enjoys the benefits associated with a pure PTFE gasket; however, it can be difficult to attain a robust pore-free fused solidified layer that adequately resists permeation under stress. Furthermore, because of the rounded convex nature of the flanges of glass-lined steel, in many cases there is a ready leak path between the pore-free fused solidified layer formed in the gasket inner part of the gasket and where the flange contacts the gasket. This leak path is shown in FIG. 20. This figure shows a side cross-sectional view of a gasketed flange assembly 90 of two conventional glass-lined steel flanges 96 which have the rounded convex mating edges 95 which contact the gasket 91 on part of its top and bottom surfaces 94. It can be seen that if only the surface layer of the internal diameter 93 of the gasket 91 is impermeable to the contained fluid, there is a ready leak path 92 through that exposed part of the gasket 91 which is not impermeable to the fluid.

It would be desirable to provide a unitary, conformable, creep resistant, high strength, chemically resistant gasket that can seal openings, especially glass-lined steel flanges, upon the application of a relatively low stress. It is therefore a purpose of the present invention to provide a unitary expanded PTFE gasket that provides a substantially air impermeable seal only upon the application of a low stress.

SUMMARY OF THE INVENTION

The present invention provides a multilayer, unitary gasket including at least one inner layer of expanded PTFE disposed between a first substantially air impermeable outer layer and a second substantially air impermeable outer layer, and a substantially air impermeable region bridging the first and second substantially air impermeable layers.

In another aspect, the present invention provides a multilayer, unitary gasket including an annular ring having a top surface, a bottom surface, an inside edge, an outside edge and an axis; a first substantially air impermeable layer disposed on the top surface; a second substantially air impermeable layer disposed on the bottom surface; at least one layer of expanded PTFE disposed between the first and second substantially air impermeable layers; and a substantially air impermeable region bridging the first and second substantially air impermeable layers; wherein all of the layers are oriented substantially perpendicular to the axis.

In another aspect, the present invention provides an annular gasket having an inner perimeter, an outer perimeter, a top surface, and a bottom surface including a first chamber of expanded PTFE disposed adjacent to the inner perimeter having a first air impermeable top layer on the top surface and a first air impermeable bottom layer on the bottom surface; a second chamber of expanded PTFE disposed adjacent to the outer perimeter having a second air impermeable top layer on the top surface and a second air impermeable bottom layer on the bottom surface; and a substantially air impermeable region disposed between first and second chambers.

In still another aspect, the present invention provides an annular gasket having an inner perimeter, an outer perimeter, a top surface, and a bottom surface with a first chamber of expanded PTFE disposed adjacent to the inner perimeter having a first top portion on the top surface and a first bottom portion on the bottom surface, wherein the first top portion and the first bottom portion are less permeable to air than the expanded PTFE of the first chamber; a second chamber of expanded PTFE disposed adjacent to the outer perimeter having a second top portion on the top surface and a second bottom portion on the bottom surface, wherein the second top portion and the second bottom portion are less permeable to air than the expanded PTFE of the second chamber; and a region disposed between the first and second chambers, the region being less permeable to air than the expanded PTFE of the first and second chambers. In alternative embodiments, the region may be disposed on either the inner or outer perimeter.

DESCRIPTION OF THE DRAWINGS

The present invention is described herein with in conjunction with the accompanying drawing, in which.

DETAILED DESCRIPTION OF THE INVENTION

The present invention provides an improved expanded PTFE gasket that provides a substantially air impermeable seal upon the application of a relatively low load to the components joined or sealed by the gasket, thereby applying a relatively low stress to the gasket. By "air impermeable" as used herein is meant resistant to transport of air through a material. Permeability may be measured using any known technique. By "low stress" as used herein is meant a stress below that required to fully densify a porous expanded PTFE gasket (less than about 20,700 kPa (3000 psi)). It generally takes at least about 20,700 kPa (3000 psi) to fully density a porous expanded PTFE gasket. Most low stress applications generally apply less than about 10340 kPa (1500 psi) gasket stress, while some low stress applications may apply less than about 2070 kPa (300 psi) gasket stress.

Figure 1:
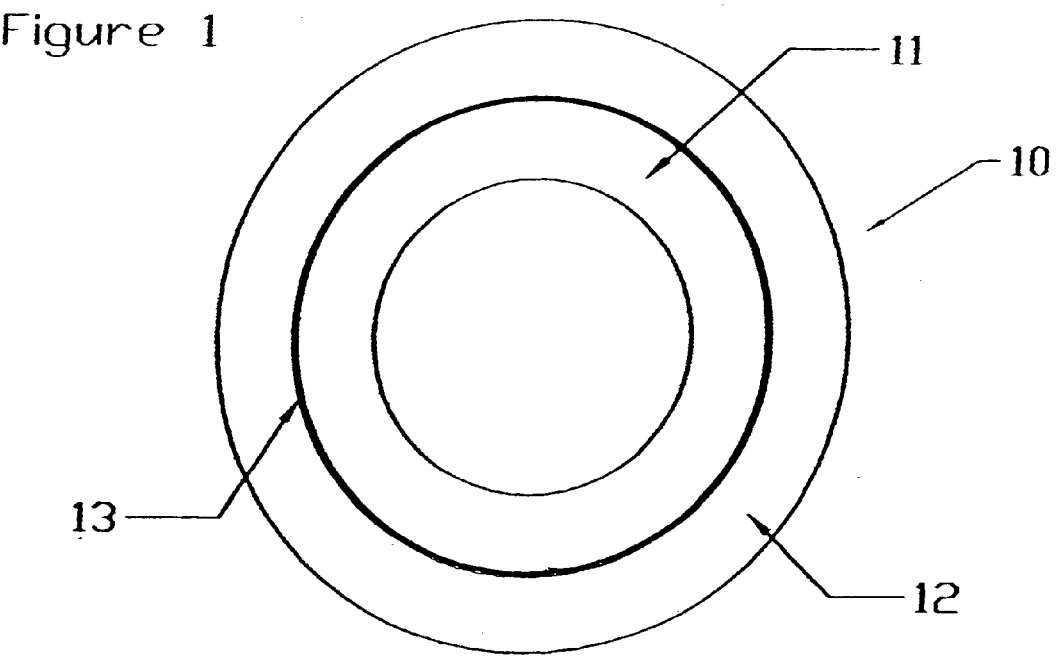
FIG. 1 is a top view of a gasket according to an exemplary embodiment of the present invention.

An exemplary embodiment of the present invention is shown in FIG. 1. Gasket 10 is shown in the shape of an annular ring, although any shape gasket may be used. Gasket 10 has a first chamber 11 and a second chamber 12. Between first chamber 11 and second chamber 12 is a substantially air impermeable region 13.

Figure 2:
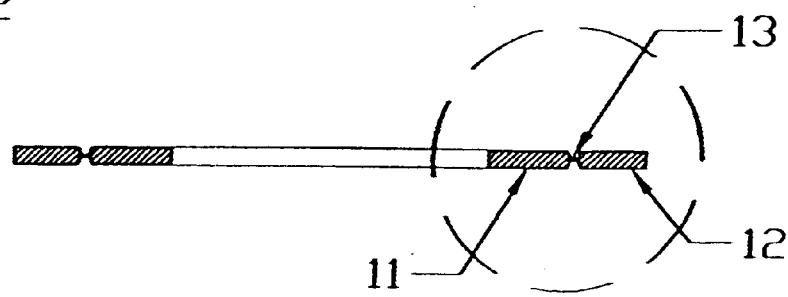
FIG. 2 is a side cross-sectional view of the gasket of FIG. 1.

As shown in FIG. 2, substantially air impermeable region 13 has a reduced thickness when compared to that of first chamber 11 and second chamber 12. The substantially air impermeable region 13 serves to isolate first chamber 11 from second chamber 12, while at the same time being connected to both first chamber 11 and second chamber 12.

Figure 3:
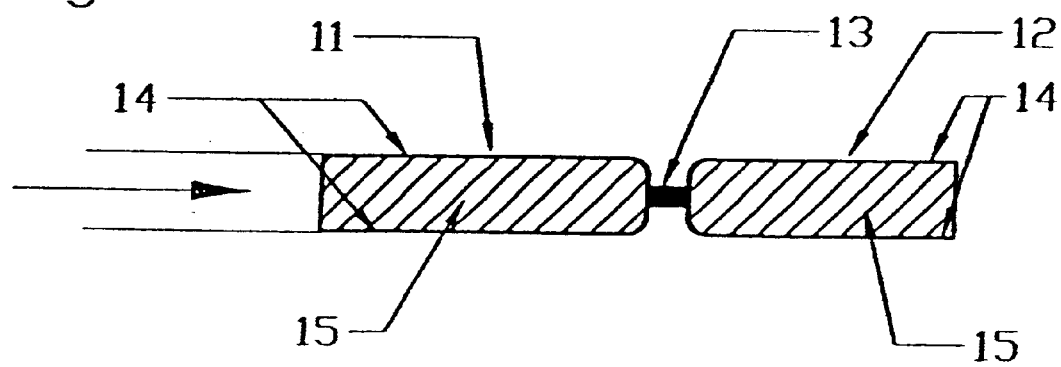
FIG. 3 is an exploded side cross-sectional view of a portion of the gasket of FIG. 2.

As shown in FIG. 3, which is an exploded view of the circled part of FIG. 2, first chamber 11 and second chamber 12 are both made up of an inner layer 15 of expanded PTFE sandwiched between substantially air impermeable layers 14 on the top and bottom surfaces of expanded PTFE layer 15. Substantially air impermeable layers 14 are preferably made of densified expanded PTFE. Densified expanded PTFE is preferred in that being PTFE it has the highest level of chemical resistance, while the expansion characteristics provide high levels of strength and creep resistance. Substantially air impermeable layers 14 may in fact comprise a plurality of such densified expanded PTFE layers. Other substantially air impermeable materials may also be used, including tetrafluoroethylene/hexafluoropropylene copolymer (FEP), tetrafluoroethylene/(perfluoroalkyl) vinyl ether copolymer (PFA), and skived PTFE. Alternatively air impermeable layers 14 may be made of expanded PTFE impregnated with a filler such as an elastomer, a fluoroelastomer, a perfluoroelastomer, or a perfluoropolyether silicone elastomer.

It is generally preferable to use the same material and same material thickness to form both air impermeable layers 14 of an individual gasket, however, there may be some applications where two different materials and/or material thickness would be desired for air impermeable layers 14 of the gasket.

Expanded PTFE layer 15 may also comprise a plurality of individual layers of expanded PTFE. Substantially air impermeable region 13 is preferably densified expanded PTFE although it may comprise any substantially air impermeable material, such a FEP, PFA and skived PTFE. Alternatively, substantially air impermeable region 13 may be made of expanded PTFE impregnated with a filler such as an elastomer, a fluoroelastomer, a perfluoroelastomer, or a perfluoropolyether silicone elastomer. In general, the more chemically resistant the type of elastomer used or other type of nonpermeable coating or filler used, the more applications the gasket will be able to provide an effective sealing solution.

In use, gasket 10 is subjected to the application of stress by mating flanges (not shown) on either side of the gasket substantially along the axis of the gasket (which is in the direction normal to the page as shown in FIG. 1). Upon application of this stress, expanded PTFE layer 15 compresses somewhat, thereby reducing the porosity of expanded PTFE layer 15. Substantially air impermeable layers 14 are preferably thin such that the surface of gasket 10 covered by substantially air impermeable layers 14 can conform to any irregularities in the surface of the flanges to which they mate. Substantially air impermeable layers 14 of thicknesses equal to or less than 1 mm can be useful, however, thicknesses equal to or less than 0.5 mm are generally even more useful, with thicknesses equal to or less than 0.15 mm generally preferred. In some applications where a very high level of conformability is desired, thicknesses equal to or less than 0.1 mm, 0.05 mm and even 0.025 mm would be preferred. Generally, the thicker the substantially air impermeable layers 14, the more impermeable the layers are. The thinner the substantially air impermeable layers 14, the less the conformability of the gasket is affected. This conformability is characteristic of the expanded PTFE layers 15 used with the gasket. In addition, substantially air impermeable layers 14 serve to form an air impermeable barrier against the transfer of fluid from inside the pipes to the surface of the flanges where they may leak around gasket 10. Because the gasket of the present invention is intended for use in applications where there is low available stress, expanded PTFE layers 15 generally do not fully compress. There is generally therefore some porosity left in expanded PTFE layers 15. It is thus possible for fluid contained within the sealed pipes to permeate through expanded PTFE layers 15 in the direction of the arrow shown in FIG. 3.

Substantially air impermeable region 13 prevents the escape of this fluid to the environment, however. Specifically, the fluid may permeate expanded PTFE layer 15 in first chamber 11 but is blocked from permeating into second chamber 12 by the substantially air impermeable region 13. In this manner, a leak-proof seal is provided.

It should be recognized that the substantially air impermeable layers 14 and the substantially air impermeable region 13 will be substantially impermeable to fluids in general, including liquids, even low surface tension liquids, such as many solvents.

A desired advantage of the present invention is that upon migration of fluid into the expanded PTFE layer 15 of first chamber 11, and upon subsequent blockage of further fluid permeation by substantially air impermeable region 13, the fluid that is "trapped" in first chamber 11 exerts an outward force against substantially air impermeable layers 14. This phenomenon helps further conform and seal substantially air impermeable layers 14 to the surfaces of the flanges, thereby improving the seal by gasket 10. Without being limited by theory, it is believed that second chamber 12 helps to provide a resistant force behind substantially air impermeable region 13 that helps prevent rupture of substantially air impermeable region 13.

Gasket 10 is preferably made by wrapping one or more layers of densified ePTFE on a mandrel to form a first air impermeable layer 14; wrapping one or more (preferably considerably more) layers of expanded PTFE around the air impermeable layer 14 to form the expanded PTFE layer 15; wrapping one or more substantially air impermeable layers around the expanded PTFE layer 15 to form the second (outer) substantially air impermeable layer 14. After heating the wrapped tube/mandrel assembly to fuse the different layers into a unitary body, the wrapped tube may then be cooled and then longitudinally cut and laid flat in the form of a sheet. The sheet may then be stamped into annular rings of desired size. Each ring is then subjected to a compressive treatment between, for example, two metal tubes in order to compress a discreet portion of the annular ring to form substantially air impermeable region 13.

It is generally preferable to use unsintered densified expanded PTFE layers as opposed to sintered densified expanded PTFE layers to wrap on the mandrel to form air impermeable layers 14 to get a better bond to the expanded PTFE layer 15.

Figure 4:
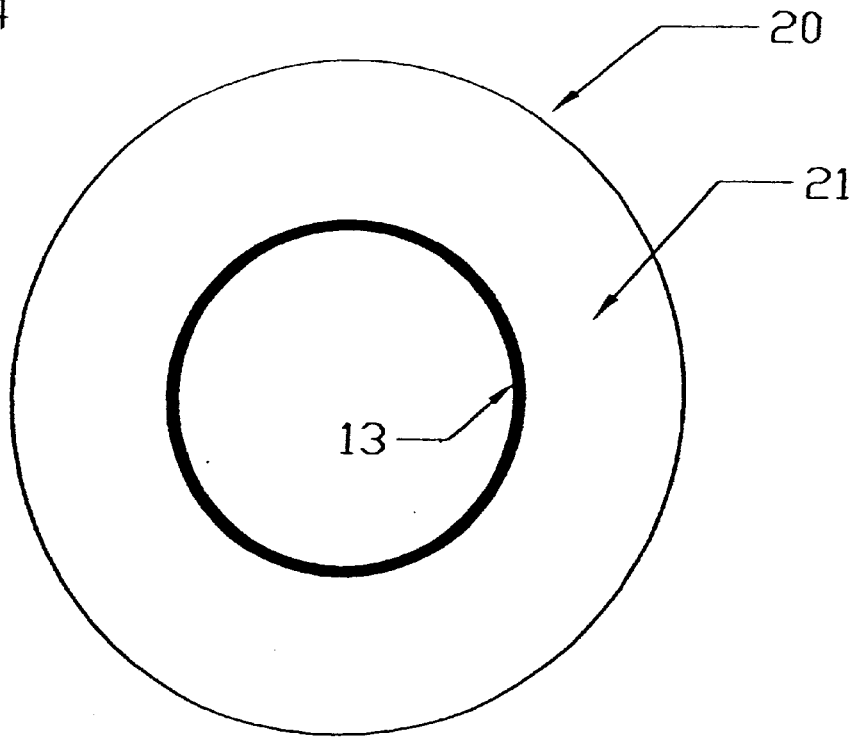
FIG. 4 is a top view of a gasket according to another exemplary embodiment of the present invention.
Figure 5:
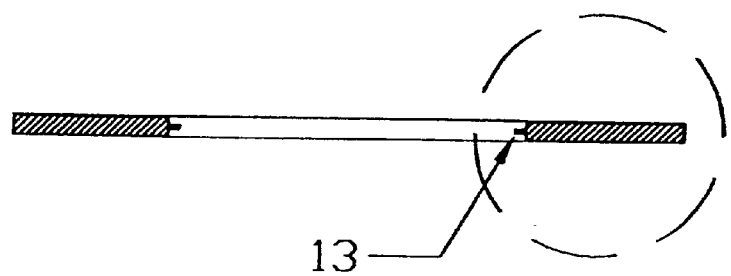
FIG. 5 is a side cross-sectional view of the gasket of FIG. 4.
Figure 6:
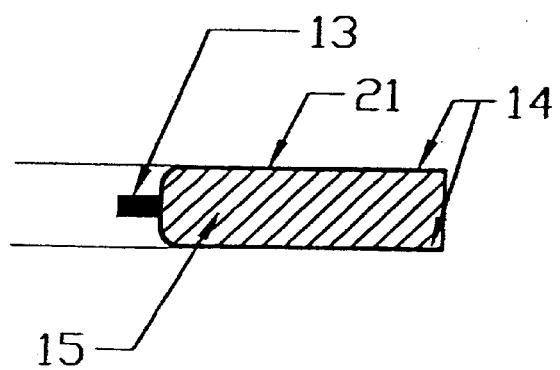
FIG. 6 is an exploded side cross-sectional view of a portion of the gasket of FIG. 5.

An alternative embodiment of the present invention is shown in FIGS. 4–6. In this embodiment, gasket 20 comprises a single chamber 21 with substantially air impermeable region 13 disposed on the inner periphery of gasket 20. Chamber 21 is formed of an inner layer 15 of expanded PTFE sandwiched by outer layers of substantially air impermeable layers 14, similar to the construction of the chambers 11 and 12 discussed in conjunction of the first embodiment. This embodiment is generally preferred in those type of applications where it is undesirable to have any ingress of fluid into the gasket, such as with many pharmaceutical applications.

Figure 7:
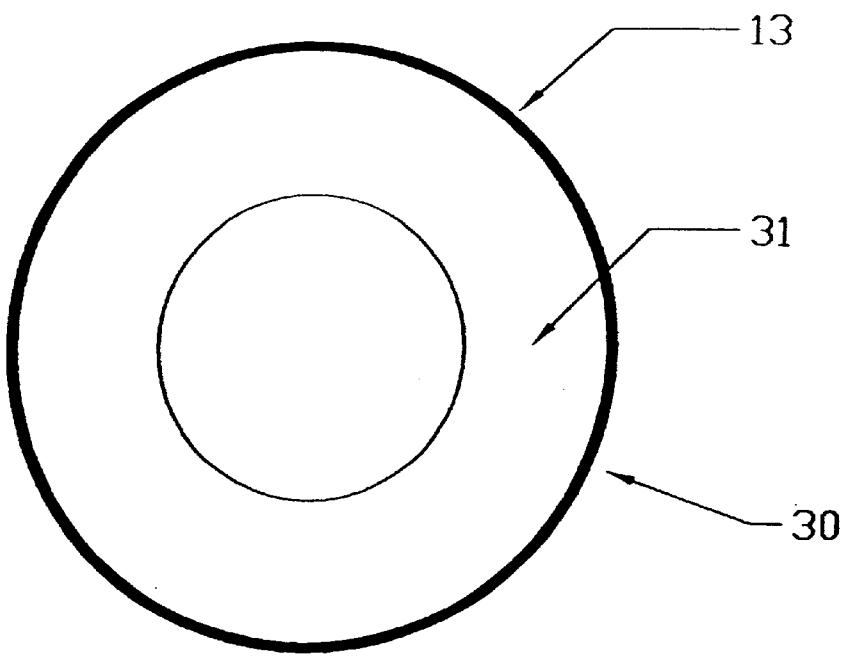
FIG. 7 is a top view of a gasket according to another exemplary embodiment of the present invention.
Figure 8:
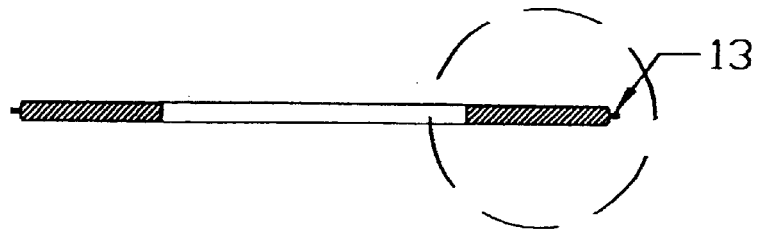
FIG. 8 is a side cross-sectional view of the gasket of FIG. 7.
Figure 9:
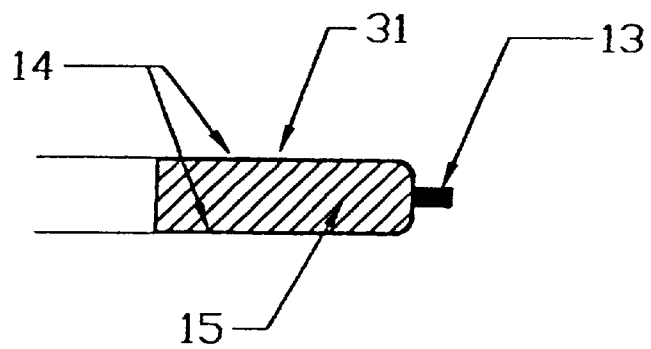
FIG. 9 is an exploded side cross-sectional view of a portion of the gasket of FIG. 8.

Another alternative embodiment of the invention is shown in FIGS. 7–9. In this embodiment, gasket 30 has a single chamber 31 with substantially air impermeable region 13 disposed on the outer periphery of gasket 30. As with the previous embodiments, chamber 31 is preferably made of a layer 15 of expanded PTFE sandwiched by substantially air impermeable layers 14.

It should also be recognized that in certain applications it may be beneficial to have more than one substantially air impermeable region 13 such that more chambers are created. These additional impermeable regions 13 can be from combinations of the aforementioned embodiments from FIGS. 1–9 or they can be from more than one air impermeable region 13 contained between the inner and outer diameters. They may even include an impermeable region 13 on the inner and/or outer diameter with more than one impermeable region 13 between the inner and outer diameters. Thus, depending on the number and location of the air impermeable regions 13 there may be more than two chambers within the gasket. One benefit of the multiple chambers is that the closed portions of the gasket could provide for an air cushioning effect in that increased loads on the gasket may be cushioned. Another benefit of having more than one air impermeable region 13 is that there are more air impermeable regions 13 which must be traversed in order to create a leak path through the gasket.

Figure 19:
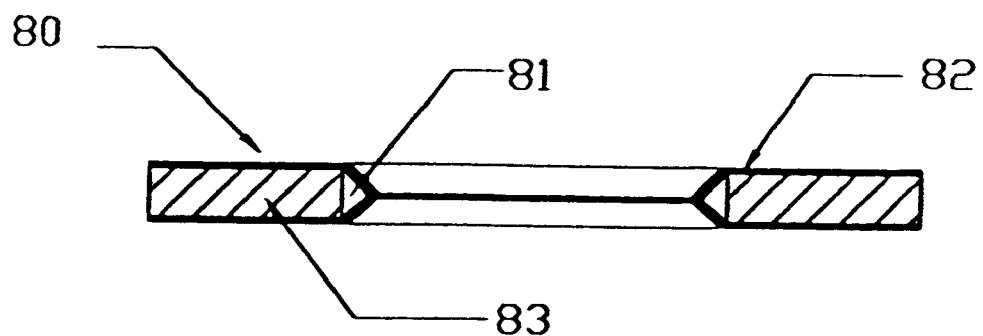
FIG. 19 is a side cross-sectional view of a conventional prior art envelope gasket.
Figure 20:
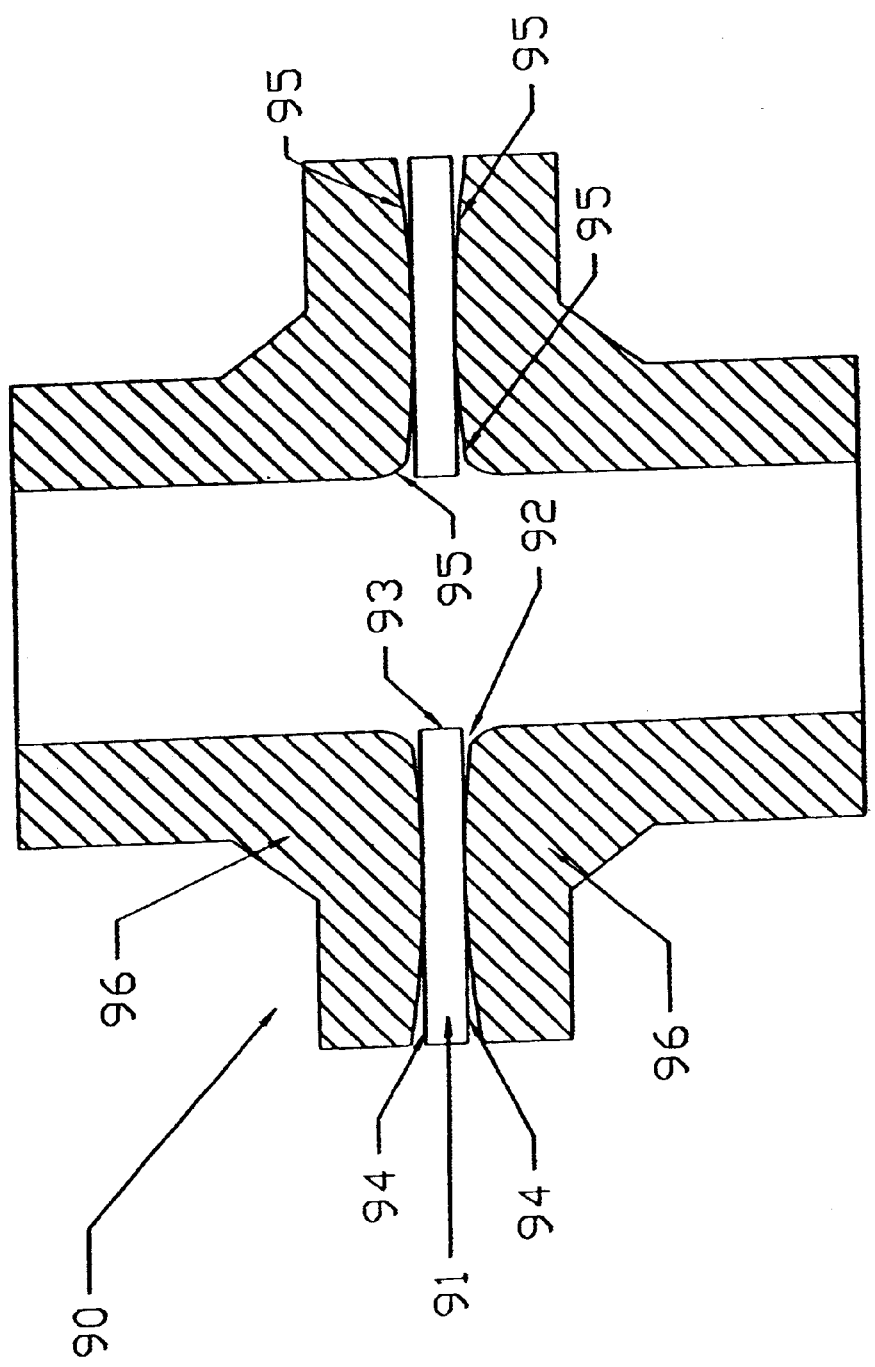
FIG. 20 is a side cross-sectional view of two conventional glass-lined steel flanges with a prior art gasket between them.

It should also be appreciated that an additional distinct advantage of the present invention over conventional envelope gaskets is the tight contact produced between the inner layer 15 to both the substantially impermeable layers 14 and the substantially air impermeable region 13. It is especially important to have this tight contact between the inner layer 15 and the substantially impermeable region 13. This tight contact prevents the aforementioned problems associated with envelope gaskets pertaining to creating wrinkles, folds and creases in the jacket, which can cause leaks. The tight contact also provides backing to the substantially air impermeable region 13 which makes it less susceptible to damage during installation and while in use. In FIG. 19, a gasket is depicted which represents a typical envelope gasket, and in particular represents the jacketed gasket 80 disclosed in previously mentioned Japanese Laid-Open Patent Application Number 4-331876 to Ueda et al. This gasket 80 has free space 81 between the jacket or sheath 82 and the core 83. This free space (lacking tight contact) can be detrimental to the gasket in application due to the above stated reasons.

EXAMPLES

The present invention will now be described in conjunction with the following examples which are intended to illustrate the invention not to limit it. In the examples, the following test methods were used.

Example 1

An annular gasket of the present invention was produced in the following manner. A continuous expanded PTFE sheet produced from fine powder PTFE resin through paste-forming techniques was obtained and expanded in directions 90 degrees opposed to each other (longitudinally and transversely) to form a microporous expanded PTFE sheet as taught in U.S. Pat. No. 4,187,390 to Gore. This sheet, having a thickness of about 0.015 mm was then rolled between two rollers at a fixed gap to compress the microporous expanded PTFE sheet into a full density non-porous expanded PTFE sheet. This non-porous sheet had a final thickness of about 0.005 mm and a final width of about 1270 mm. Five layers of this full density sheet were wrapped around a 584 mm diameter mandrel.

A second continuous expanded PTFE sheet produced from fine powder PTFE resin through paste-forming techniques was obtained and expanded in directions 90 degrees opposed to each other (longitudinally and transversely) to form a microporous expanded PTFE sheet as taught in U.S. Pat. No. 4,187,390 to Gore. One hundred layers of this second microporous expanded PTFE sheet, measuring approximately 1600 mm wide and 0.038 mm thick was then wrapped on the mandrel covering the previously wrapped full density expanded PTFE sheet.

Then five more layers of the first non-porous expanded PTFE sheet were again wrapped onto the mandrel covering the microporous expanded PTFE sheet. The microporous expanded PTFE layers were then secured at the ends of the mandrel to resist the tendency of this material to shrink back on itself at elevated temperatures. All the layers were then sintered while secured to the mandrel in an oven at 370° C. for approximately 45 minutes to bond the layers together. After cooling, the PTFE material was longitudinally cut from the mandrel in the form of a sheet.

An annular ring shape having an inner diameter of 89 mm and outer diameter of 135 mm was then cut from the sheet and selectively compressed to form the substantially air impermeable region 13 between the full density PTFE substantially air impermeable layers 14. The substantially air impermeable region 13 was formed in the annular gasket of this example by compressing the gasket between annular dies having an inner diameter of 104.8 mm and outer diameter of 108.0 mm. The dies were heated to 200° C. and loaded to a pressure around 51.7 MPa (7500 psi). The load was maintained for approximately fifteen seconds.

Both substantially air impermeable layers 14 of this example measured to be 0.025 mm (0.001 inches) thick. This gasket was an annular ring gasket with an inner diameter of 89 mm and outer diameter of 135 mm and a total thickness of 3.0 mm. The compressed air impermeable region 13 had an inner diameter of 104.8 mm and an outer diameter of 108.0 mm. This is one version of the inventive gasket shown in FIGS. 1–3.

Comparative Example 2

Figure 10:
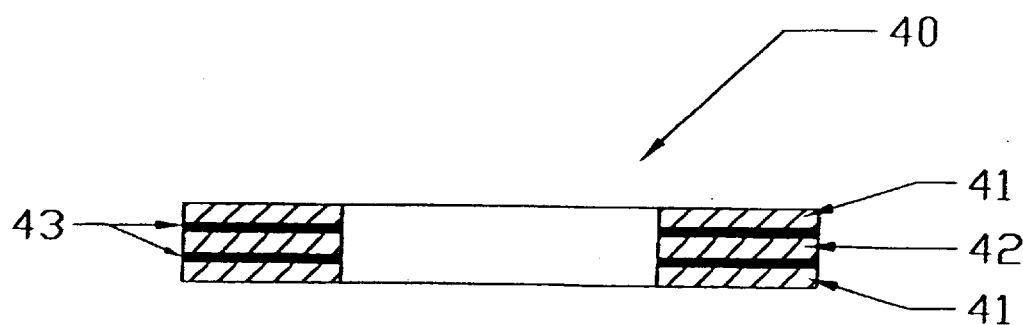
FIG. 10 is a side cross-sectional view of a gasket cut from GORE-TEX GR® Style R sheet gasketing.

A sheet of 0.125 inch (3.2 mm) thick GORE-TEX GR® Style R sheet gasketing disclosed in U.S. Pat. No. 5,879,789 to Dolan, et al., and commercially available from W. L. Gore & Associates, Inc. of Newark, Del., was obtained. An annular ring gasket was cut from this sheet material. FIG. 10 shows the cross section of this annular ring gasket 40 which comprises: outer layers 41 of conformable microporous expanded PTFE material; rigid inner layers 43 of full density expanded PTFE material attached to each of the outer layers 41 and a center layer 42 of conformable microporous expanded PTFE material attached between each of the rigid inner layers 43.

The annular gasket had an inner diameter of 89 mm and an outer diameter of 135 mm and was 3.2 mm thick.

Example 3

Another annular gasket in accordance with the present invention of the construction shown in FIGS. 1–3 was produced. First, a commercially available sheet of 0.125 inch (3.2 mm) thick GORE-TEX GR® Style R sheet gasketing described in Comparative Example 2 was obtained. The outer conformable microporous expanded PTFE layers 41 were peeled by hand from the sheet material exposing the rigid inner layers 43 of PTFE as the new outer layers. The rigid inner layers 43 of the GORE-TEX GR® Style R sheet gasketing were comprised of densified expanded PTFE material with a density at or near full density, 2.2 g/cc, and had a thickness of 0.15 mm (0.006 inches).

An annular ring shape having an inner diameter of 89 mm and outer diameter of 135 mm was then cut from the peeled sheet and selectively compressed to form the substantially air impermeable region 13 between the full density PTFE substantially air impermeable layers 14. The substantially air impermeable region 13 was formed in the annular gasket of this example by compressing the gasket between annular dies having an inner diameter of 104.8 mm and outer diameter of 108.0 mm. The dies were heated to 200° C. and loaded to a pressure around 51.7 MPa (7500 psi). The load was maintained for approximately fifteen seconds.

The annular ring gasket had an inner diameter of 89 mm and outer diameter of 135 mm and thickness of 3.0 mm. The compressed air impermeable region 13 had an inner diameter of 104.8 mm and an outer diameter of 108.0 mm.

Example 4

A gasket in accordance with the present invention was produced in a manner similar to Example 1. The same full density non-porous expanded PTFE sheet produced in Example 1 was used to form the substantially air impermeable layers 14 and the same microporous expanded PTFE sheet produced in Example 1 was used to form the conformable microporous inner layer 15.

First, two layers of the non-porous expanded PTFE sheet were wrapped around the 584 mm diameter mandrel. Then one hundred layers of the microporous expanded PTFE sheet were wrapped around the mandrel. This was followed by wrapping two more layers of the non-porous expanded PTFE sheet around the mandrel. The microporous layers were secured at the ends of the mandrel and the same heating procedure was used as in Example 1 to bond the layers together. After cooling, the PTFE material was then longitudinally cut from the mandrel in the form of a sheet.

An annular ring shape having an inner diameter of 89 mm and outer diameter of 135 mm was then cut from the sheet and selectively compressed to form the substantially air impermeable region 13 between the full density PTFE substantially air impermeable layers 14. The substantially air impermeable region 13 was formed by compressing the gasket between annular dies having an inner diameter of 104.8 mm and outer diameter of 108.0 mm. The dies were heated to 200° C. and loaded to a pressure around 51.7 MPa (7500 psi). The load was maintained for approximately fifteen seconds.

Both substantially air impermeable layers 14 of this example measured to be 0.01 mm (0.0004 inches) thick. This gasket was an annular ring gasket with an inner diameter of 89 mm and outer diameter of 135 mm and a total thickness of 3.0 mm. The compressed air impermeable region 13 had an inner diameter of 104.8 mm and an outer diameter of 108.0 mm. This is another version of the inventive gasket shown in FIGS. 1–3.

Example 5

An annular gasket in accordance with the present invention of the construction shown in FIGS. 4–6 was produced in a manner similar to Example 3. A peeled sheet having outer layers of full density expanded PTFE with an inner layer of conformable microporous expanded PTFE was produced as in Example 3. An annular ring gasket was then cut from the peeled sheet having an inner diameter of 104.8 mm and an outer diameter of 160 mm. An air impermeable region 13 was then formed by compressing the ring gasket between annular dies having an inner diameter (104.8 mm) equal to the inner diameter of the gasket, and an outer diameter of 108.0 mm. The dies were heated to 200° C. and loaded to a pressure around 51.7 MPa (7500 psi). The load was maintained for approximately fifteen seconds.

The final annular gasket had an inner diameter of 104.8 mm and outer diameter of 160 mm and thickness of 3.0 mm. The compressed air impermeable region had an inner diameter 104.8 mm and an outer diameter of 108.0 mm. The air impermeable layers 14 had a thickness of 0.15 mm (0.006 inches).

Example 6

Figure 11:
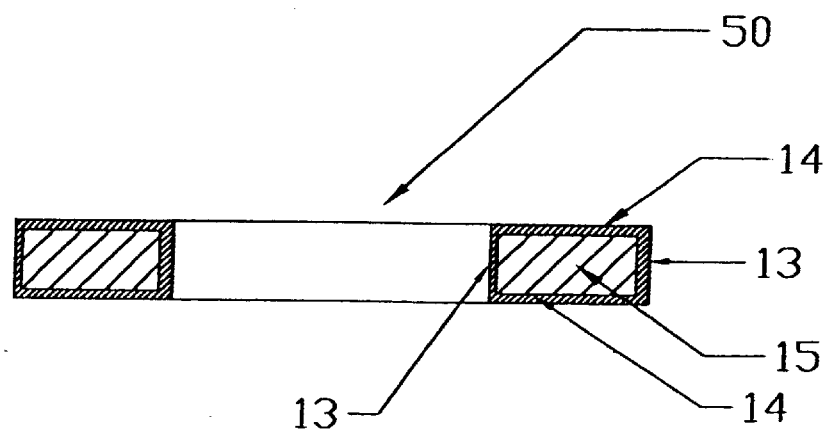
FIG. 11 is a side cross sectional view of a gasket to another exemplary embodiment of the present invention.

This example, shown in FIG. 11, demonstrates a further embodiment of the present invention where a conformable microporous expanded PTFE material cut in the form of an annular ring gasket is coated with a substantially air impermeable coating.

First, a microporous expanded PTFE sheet of 0.125 inch (3.2 mm) thick GORE-TEX GR® sheet gasketing, commercially available from W. L. Gore & Associates, Inc., was obtained. An annular ring with an inner diameter of 86 mm and outer diameter of 133 mm was cut from the sheet. The annular ring was then coated with a perfluoropolyether silicone elastomer, SIFEL™ 610, available from Shin-Etsu Chemical Co., Ltd., in the following way. The annular ring was dipped into a bath of the elastomer for a period of five minutes, allowing the elastomer to soak into the surface porosity of the GORE-TEX GR® sheet gasketing. Immediately after the five minutes of dipping, the excess elastomer was scraped form the surfaces of the annular ring. The coated annular ring was then cured in an oven at 175° C. for four hours producing the final annular ring gasket 50.

In this example, both the air impermeable layers 14 and the air impermeable regions 13 were formed from the elastomer soaking into the porosity of the microporous expanded PTFE. The expanded PTFE inner layer 15 was that part of the expanded PTFE that the elastomer did not soak into. The air impermeable regions 13 were at both the inner and outer diameters of the gasket 50. The air impermeable layers 14 and air impermeable regions 13 were about 0.13 mm thick.

Example 7

An annular gasket in accordance with the present invention was produced in a manner similar to Example 1. The same full density non-porous expanded PTFE sheet produced in Example 1 was used to form the substantially air impermeable layers 14 and the same microporous expanded PTFE sheet produced in Example 1 was used to form the conformable microporous inner layer 15.

First, ten layers of the non-porous expanded PTFE sheet were wrapped around the 584 mm diameter mandrel. Then one hundred layers of the microporous expanded PTFE sheet were wrapped around the mandrel. This was followed by wrapping ten more layers of the non-porous expanded PTFE sheet around the mandrel. The microporous layers were secured at the ends of the mandrel and the same heating procedure was used as in Example 1 to bond the layers together. After cooling, the PTFE material was then longitudinally cut from the mandrel in the form of a sheet.

An annular ring shape having an inner diameter of 89 mm and outer diameter of 135 mm was then cut from the sheet and selectively compressed to form the substantially air impermeable region 13 between the full density PTFE substantially air impermeable layers 14. The substantially air impermeable region 13 was formed by compressing the gasket between annular dies having an inner diameter of 104.8 mm and outer diameter of 108.0 mm. The dies were heated to 200° C. and loaded to a pressure around 51.7 MPa (7500 psi). The load was maintained for approximately fifteen seconds.

Both substantially air impermeable layers 14 of this example measured to be 0.05 mm (0.002 inches) thick. This gasket was an annular ring gasket with an inner diameter of 89 mm and outer diameter of 135 mm and a total thickness of 3.0 mm. The compressed air impermeable region 13 had an inner diameter of 104.8 mm and an outer diameter of 108.0 mm. This is another version of the inventive gasket shown in FIGS. 1–3.

Example 8

An annular gasket in accordance with the present invention of the construction shown in FIGS. 7–9 was produced in a manner similar to Example 3. A peeled sheet having outer layers of full density expanded PTFE with an inner layer of conformable microporous expanded PTFE was produced as in Example 3. An annular ring shape was then cut from the peeled sheet having an inner diameter of 60 mm and an outer diameter of 108 mm. An air impermeable region 13 was then formed by compressing the ring gasket between annular dies having an outer diameter (108.0 mm) equal to the outer diameter of the gasket and an inner diameter of 104.8 mm. The dies were heated to 200° C. and loaded to a pressure around 51.7 MPa (7500 psi). The load was maintained for approximately fifteen seconds.

The final annular gasket had an inner diameter of 60 mm and outer diameter of 108 mm and thickness of 3.0 mm. The compressed air impermeable region had an inner diameter 104.8 mm and an outer diameter of 108.0 mm. The air impermeable layers 14 had a thickness of 0.15 mm (0.006 inches).

Comparative Example 9

First, a microporous expanded PTFE sheet of 0.125 inch (3.2 mm) thick GORE-TEX GR® sheet gasketing, commercially available from W. L. Gore & Associates, Inc., was obtained. An annular ring gasket was cut from the sheet. The annular ring gasket had an inner diameter of 60.8 mm, an outer diameter of 107 mm and was 3.2 mm thick.

Example 10

An annular gasket in accordance with the present invention of the construction shown in FIGS. 4–6 was produced in a manner similar to Example 3. A peeled sheet having outer layers of full density expanded PTFE with an inner layer of conformable microporous expanded PTFE was produced as in Example 3. An annular ring shape was then cut from the peeled sheet having an inner diameter of 60.8 mm and an outer diameter of 107 mm. An air impermeable region 13 was then formed between the full density expanded PTFE substantially air impermeable layers 14 by compressing the ring gasket between annular dies having an inner diameter (60.8 mm) equal to the inner diameter of the gasket and an outer diameter of 64.0 mm. The dies were heated to 200° C. and loaded to a pressure around 51.7 MPa (7500 psi). The load was maintained for approximately fifteen seconds.

The annular ring gasket had an inner diameter of 60.8 mm and outer diameter of 107 mm and thickness of 3.0 mm. The compressed air impermeable region 13 had an inner diameter of 60.8 mm and an outer diameter of 64.0 mm. The air impermeable layers 14 had a thickness of 0.15 mm (0.006 inches).

Example 11

An annular gasket in accordance with the present invention of the construction shown in FIGS. 1–3 was produced in a manner similar to Example 3. A peeled sheet having outer layers of full density expanded PTFE with an inner layer of conformable microporous expanded PTFE was produced as in Example 3. An annular ring shape was then cut from the peeled sheet having an inner diameter of 60.8 mm and an outer diameter of 107 mm. An air impermeable region 13 was then formed between the full density expanded PTFE substantially air impermeable layers 14 by compressing the ring gasket between annular dies having an inner diameter of 81.5 mm and an outer diameter of 84.7 mm. The dies were heated to 200° C. and loaded to a pressure around 51.7 MPa (7500 psi). The load was maintained for approximately fifteen seconds.

The annular ring gasket had an inner diameter of 60.8 mm and outer diameter of 107 mm and thickness of 3.0 mm. The compressed air impermeable region 13 had an inner diameter of 81.5 mm and an outer diameter of 84.7 mm. The air impermeable layers 14 had a thickness of 0.15 mm (0.006 inches).

Example 12

Figure 13:
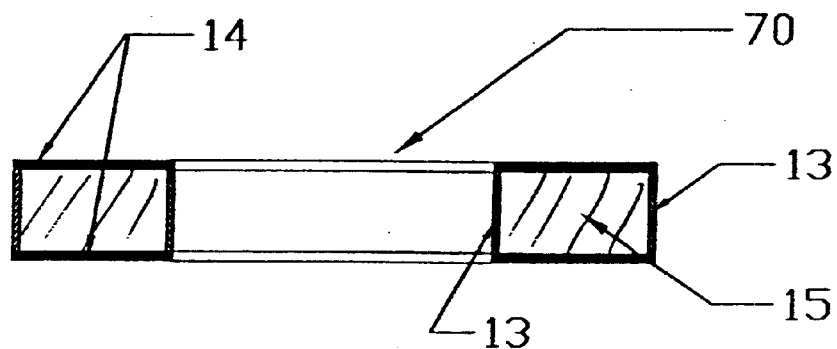
FIG. 13 is a side cross-sectional view of a gasket to another exemplary embodiment of the present invention.

An annular gasket in accordance with the present invention of the construction shown in FIG. 13 was produced in the following way. First, a peeled sheet having outer layers of full density expanded PTFE with an inner layer of conformable microporous expanded PTFE was produced as in Example 3. An annular ring shape was then cut from the peeled sheet. As in Example 6, the annular ring shape was then dipped into a bath of a perfluoropolyether silicone elastomer, SIFEL™ 610, for a period of five minutes. Immediately after the five minutes of dipping, the excess elastomer was scraped form the surfaces of the annular ring. The coated annular ring was then cured in an oven at 175° C. for four hours producing the final gasket 70.

In this example, the air impermeable regions 13 were formed from the elastomer soaking into the porosity of the microporous expanded PTFE inner layer 15. The air impermeable regions 13 were at both the inner and outer diameters of the gasket. Due to the non-porous nature of the full density expanded PTFE outer layers, the elastomer was not able to soak into these outer layers. Thus, the air impermeable layers 14 are formed from the full density expanded PTFE outer layers while the air impermeable regions 13 were formed from the cured elastomer/expanded PTFE composite.

Example 13

Figure 12:
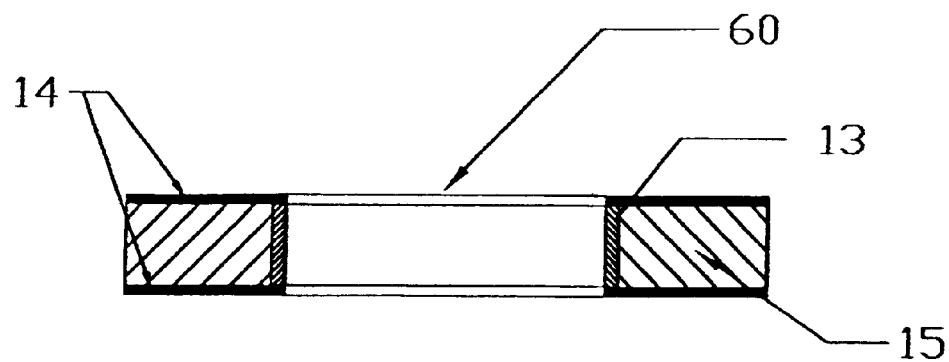
FIG. 12 is a side cross-sectional view of a gasket to another exemplary embodiment of the present invention.

An annular gasket in accordance with the present invention of the construction shown in FIG. 12 was produced in the following way. First, a peeled sheet having outer layers of full density expanded PTFE with an inner layer of conformable microporous expanded PTFE was produced as in Example 3. An annular ring shape was then cut from the peeled sheet. The annular ring shape was then laid flat on a smooth surface and a perfluoropolyether silicone elastomer, SIFEL™ 610, was poured to fill the cavity bounded by the inner diameter of the annular ring, so that the inner diameter of the annular ring was exposed to the elastomer while the outer diameter was not exposed to the elastomer. After five minutes of soaking, the excess elastomer was scraped form the exposed surface of the annular ring. The coated annular ring was then cured in an oven at 175° C. for four hours producing the final gasket 60.

In this example, the air impermeable region 13 was formed from the elastomer soaking into the porosity of the microporous expanded PTFE inner layer 15. The air impermeable region 13 was at only the inner diameter of the gasket, because the outer diameter was not exposed to the elastomer. Due to the non-porous nature of the full density expanded PTFE outer layers, the elastomer was not able to soak into these outer layers. Thus, the air impermeable layers 14 are formed from the full density expanded PTFE outer layers while the air impermeable region 13 was formed from the cured elastomer/expanded PTFE composite.

Comparative Example 14

First, a microporous expanded PTFE sheet of 0.125 inch (3.2 mm) thick GORE-TEX GR® sheet gasketing, commercially available from W. L. Gore & Associates, Inc., was obtained. An annular ring gasket was cut from the sheet. The annular gasket had an inner diameter of 89 mm and an outer diameter of 135 mm and was 3.2 mm thick.

Comparative Example 15

A comparative gasket was produced in the following way. First, a commercially available sheet of 0.125 inch (3.2 mm) thick GORE-TEX GR® Style R sheet gasketing described in Comparative Example 2 was obtained. The outer conformable microporous expanded PTFE layers 41 were peeled by hand from the sheet material exposing the rigid inner layers 43 of PTFE as the new outer layers. The rigid inner layers 43 of the GORE-TEX GR® Style R sheet gasketing were comprised of densified expanded PTFE material with a density at or near full density, 2.2 g/cc, and had a thickness of 0.15 mm (0.006 inches) and were substantially air impermeable.

An annular ring shape gasket having an inner diameter of 89 mm and outer diameter of 135 mm was then cut from the peeled sheet.

Although this gasket had substantially air impermeable layers 14, it did not have a substantially air impermeable region 13.

Comparative Example 16

First, a microporous expanded PTFE sheet of 0.125 inch (3.2 mm) thick GORE-TEX GR® sheet gasketing, commercially available from W. L. Gore & Associates, Inc., was obtained. An annular ring having an inner diameter of 89 mm and an outer diameter of 135 mm was cut from the sheet. A substantially air impermeable region 13 was formed by compressing the gasket between annular dies having an inner diameter of 104.8 mm and outer diameter of 108.0 mm. The dies were heated to 200° C. and loaded to a pressure around 51.7 MPa (7500 psi). The load was maintained for approximately fifteen seconds.

The annular ring gasket had an inner diameter of 89 mm and outer diameter of 135 mm and thickness of 3.2 mm. The compressed air impermeable region 13 had an inner diameter of 104.8 mm and an outer diameter of 108.0 mm. Although this gasket had a substantially air impermeable region 13, it did not have substantially air impermeable layers 14.

Example 17

A roll of full density skived PTFE (0.051 mm thick, 610 mm wide) commercially available from Fluoroplastics, Inc., of Philadelphia, Pa. was obtained. A single layer of this sheet was wrapped about the circumference of a 168 mm diameter stainless steel mandrel. One hundred layers of the second microporous expanded PTFE sheet produced in Example 1, measuring 0.038 mm thick, was then wrapped on the mandrel covering the previously wrapped skived PTFE layer. A layer of the 0.051 mm thick skived PTFE was wrapped about the layers of membrane. Forty additional layers of microporous expanded PTFE membrane were wrapped on top of the skived PTFE Film layer to hold the films in contact during the heating cycle. The microporous expanded PTFE layers were then secured at the ends of the mandrel to resist the tendency of this material to shrink back on itself at elevated temperatures.

The wrapped mandrel was placed in an electric air oven and the oven was then heated to a temperature of 365° C. over a period of two hours. During the first hour of the heating cycle, the oven climbed to the set temperature. The oven was at the set temperature for the second hour. Upon completion of the heating cycle, the laminate was allowed to cool to room temperature and was cut free of the steel mandrel. The additional forty layers of the microporous expanded PTFE membrane which were used to hold the films in contact were then peeled from the bonded sheet and discarded. The skived PTFE film demonstrated moderate adhesion to the expanded PTFE.

An annular ring shape having an inner diameter of 89 mm and outer diameter of 135 mm was then cut from the bonded sheet and selectively compressed to form the substantially air impermeable region 13 between the full density skived PTFE substantially air impermeable layers 14. The substantially air impermeable region 13 was formed in the annular gasket of this example by compressing the gasket between annular dies having an inner diameter of 104.8 mm and outer diameter of 108.0 mm. The dies were heated to 200° C. and loaded to a pressure around 51.7 MPa (7500 psi). The load was maintained for approximately fifteen seconds.

Both substantially air impermeable layers 14 of this example measured to be 0.05 mm (0.002 inches) thick. This gasket was an annular ring gasket with an inner diameter of 89 mm and outer diameter of 135 mm and a total thickness of 3.0 mm. The compressed air impermeable region 13 had an inner diameter of 104.8 mm and an outer diameter of 108.0 mm. This is another version of the inventive gasket shown in FIGS. 1–3.

Example 18

A single layer of skived PTFE (0.051 mm, 610 mm wide) from Example 17 was wrapped about the circumference of a 168 mm diameter stainless steel mandrel. This layer was to act as a release liner for the removal of the gasket material from the mandrel. Three layers of a 0.051 mm thick PFA film commercially available from E.l. du Pont de Nemours, Inc., of Wilmington, Del., designated 200OLP high performance PFA film having a width of 457 mm were wrapped about the skived PTFE layer. One hundred layers of the second microporous expanded PTFE sheet produced in Example 1, measuring 0.038 mm thick, was then wrapped on the mandrel covering the previously wrapped PFA film layers. Three layers of 0.051 mm thick PFA film were then wrapped on top of the microporous expanded PTFE membrane. A layer of the 0.051 mm thick skived PTFE was then wrapped about the PFA layers. Forty additional layers of the microporous expanded PTFE membrane were wrapped on top of the skived PTFE layer to hold the films in contact during the heating cycle. The microporous expanded PTFE layers were then secured at the ends of the mandrel to resist the tendency of this material to shrink back on itself at elevated temperatures.

The wrapped mandrel was placed in an electric air oven and the oven was then heated to a temperature of 365° C. over a period of two hours. During the first hour of the heating cycle, the oven climbed to the set temperature. The oven was at the set temperature for the second hour. Upon completion of the heating cycle, the laminate was allowed to cool to room temperature and was cut free of the steel mandrel. The additional forty layers of the microporous expanded PTFE membrane which were used to hold the films in contact and the skived PTFE layers were then peeled from the bonded sheet and discarded. The bonded sheet now consisted of the outer PFA film layers with an inner layer of the microporous expanded PTFE layers.

An annular ring shape having an inner diameter of 89 mm and outer diameter of 135 mm was then cut from the bonded sheet and selectively compressed to form the substantially air impermeable region 13 between the PFA substantially air impermeable layers 14. The substantially air impermeable region 13 was formed in the annular gasket of this example by compressing the gasket between annular dies having an inner diameter of 104.8 mm and outer diameter of 108.0 mm. The dies were heated to 200° C. and loaded to a pressure around 51.7 MPa (7500 psi). The load was maintained for approximately fifteen seconds.

Both substantially air impermeable layers 14 of this example measured to be 0.15 mm (0.006 inches) thick. This gasket was an annular ring gasket with an inner diameter of 89 mm and outer diameter of 135 mm and a total thickness of 3.0 mm. The compressed air impermeable region 13 had an inner diameter of 104.8 mm and an outer diameter of 108.0 mm. This is another version of the inventive gasket shown in FIGS. 1–3.

Comparative Example 19

First, a microporous expanded PTFE sheet of 0.125 inch (3.2 mm) thick GORE-TEX GR® sheet gasketing, commercially available from W. L. Gore & Associates, Inc., was obtained. An annular ring gasket was cut from the sheet. The annular gasket had an inner diameter of 89 mm and an outer diameter of 132 mm and was 3.2 mm thick.

Example 20

An annular gasket in accordance with the present invention of the construction shown in FIG. 11 was produced in the same manner as the gasket of Example 6. The only difference was the annular ring that was cut from the microporous expanded PTFE sheet had an inner diameter of 89 mm and an outer diameter of 132 mm.

In this example, both the air impermeable layers 14 and the air impermeable regions 13 were formed from the elastomer soaking into the porosity of the microporous expanded PTFE. The expanded PTFE inner layer 15 was that part of the expanded PTFE that the elastomer did not soak into. The air impermeable regions 13 were at both the inner and outer diameters of the gasket 50. The air impermeable layers 14 and air impermeable regions 13 were about 0.13 mm thick.

The annular gasket had an inner diameter of 89 mm and an outer diameter of 132 mm and was 3.2 mm thick.

Example 21

A gasket in accordance with the present invention was produced in a manner similar to Example 1. The same full density non-porous expanded PTFE sheet produced in Example 1 was used to form the substantially air impermeable layers 14 and the same microporous expanded PTFE sheet produced in Example 1 was used to form the conformable microporous inner layer 15.

First, two layers of the non-porous expanded PTFE sheet were wrapped around the 584 mm diameter mandrel. Then one hundred layers of the microporous expanded PTFE sheet were wrapped around the mandrel. This was followed by wrapping two more layers of the non-porous expanded PTFE sheet around the mandrel. The microporous layers were secured at the ends of the mandrel and the same heating procedure was used as in Example 1 to bond the layers together. After cooling, the PTFE material was then longitudinally cut from the mandrel in the form of a sheet.

An annular ring shape having an inner diameter of 89 mm and outer diameter of 132 mm was then cut from the sheet and selectively compressed to form the substantially air impermeable region 13 between the full density PTFE substantially air impermeable layers 14. The substantially air impermeable region 13 was formed by compressing the gasket between annular dies having an inner diameter equal to the inner diameter of the annular ring (89.0 mm) and outer diameter of 93.2 mm. The dies were heated to 200° C. and loaded to a pressure around 51.7 MPa (7500 psi). The load was maintained for approximately fifteen seconds.

Both substantially air impermeable layers 14 of this example measured to be 0.01 mm (0.0004 inches) thick. This gasket was an annular ring gasket with an inner diameter of 89 mm and outer diameter of 132 mm and a total thickness of 3.0 mm. The compressed air impermeable region 13 had an inner diameter of 89.0 mm and an outer diameter of 93.2 mm. This was another version of the inventive gasket shown in FIGS. 1–3.

Sealability Test 1

Sealability was determined by leak rate tests performed in accordance with procedures and equipment outlined in ASTM F37-95 Test Method B, which is suitable for measuring precise leakage rates as high as 6 l/hr and as low as 0.3 ml/hr. The gasket stress was selected to be 10.3 MPa (1500 psi). The test fluid was air at 0.62 MPa (90 psi). The gaskets were loaded to the selected compressive stress between two smooth steel press platens with a surface finish of RMS 32 held at room temperature. The gaskets were then subjected to the 0.62 MPa internal air pressure introduced into the center of the annular gasket that is compressed between the press platens. The air pressure within the test assembly was then isolated from the environment by closing a valve. The leakage rate was determined by a change in the level of manometer fluid located in the line upstream from the gasket test fixture over a period of time. The change in the manometer was due to air leakage past the gasket to the environment resulting in loss of internal air pressure. The manometer readings were converted to leakage rates using the equation below:

$$LR = \frac{MR * 2.54 * A * 60}{T * SG}$$

where:
LR is Leakage Rate (ml/hr)
MR is manometer reading (inches)
2.54 constant is to convert manometer reading from (in) to (cm)
A is the cross sectional area of inside the manometer tube (cm$^2$)
T is time (min)
60 constant is to convert time from (min) to (hr)
SG is specific gravity of manometer fluid The manometer linear scale must match the specific gravity of the fluid used. In this test, the manometer scale was calibrated for 0.827 specific gravity fluid. The fluid used was R 827 oil (specific gravity 0.827) commercially available from Dynatech Frontier Corporation of Albuquerque, N. Mex. The manometer used had an internal tube diameter of 0.25 inches (0.635 cm). Manometer readings were taken at five, ten and fifteen minutes.

The sealability test above was conducted on the inventive embodiments of Examples 1, 3, 4, 5, 6 and 7 versus Comparative Examples 2, 14, 15 and 16 with the results shown in Table I below. These results are also graphed in FIG. 14. The graph shows that all of the examples representing different constructions of the inventive gaskets had a much lower leak rate than all the comparative examples.

Comparative Examples 14 and 2 represented commercial expanded PTFE gaskets. Comparative Example 14 was a microporous expanded PTFE gasket. Comparative Example 2 was a microporous expanded PTFE gasket with two rigid inner layers 43 of full density expanded PTFE material inside. Comparative Example 15 was a microporous PTFE gasket with outer layers of full density PTFE, created by peeling off the microporous outer layers of Comparative Example 2. Thus, Comparative Example 15 had substantially air impermeable layers 14, but did not have a substantially air impermeable region 13. Thus, there was not a significant improvement of leak rate of Comparative Example 15 over the commercial gasket of Comparative Example 2. Examples 3 and 5, however, show a vast improvement over both Comparative Examples 2 and 15. Examples 3 and 5 have the same air impermeable layers 14 as Comparative Example 15. The difference between Comparative Example 15 and the inventive gaskets of Examples 3 and 5 is that Examples 3 and 5 have the substantially air impermeable region 13 to compliment the substantially air impermeable layers 14. Thus, it can be seen that without the substantially air impermeable region 13, the gasket of Comparative Example 15 did not enjoy the potential sealing benefits of the air impermeable layers 14.

Comparative Example 16, on the other hand, was a microporous expanded PTFE gasket with a substantially air impermeable region 13, but did not have substantially air impermeable layers 14. This gasket also did not show much improvement over the commercially available gaskets. Although there was the substantially air impermeable region 13, there was a free passage way for leakage through the microporous expanded PTFE because there was no substantially air impermeable layers 14 to compliment the substantially air impermeable region 13. Thus, it can be seen that without the substantially air impermeable layers 14, the gasket did not enjoy the potential sealing benefits of the air impermeable region 13.

Figure 14:
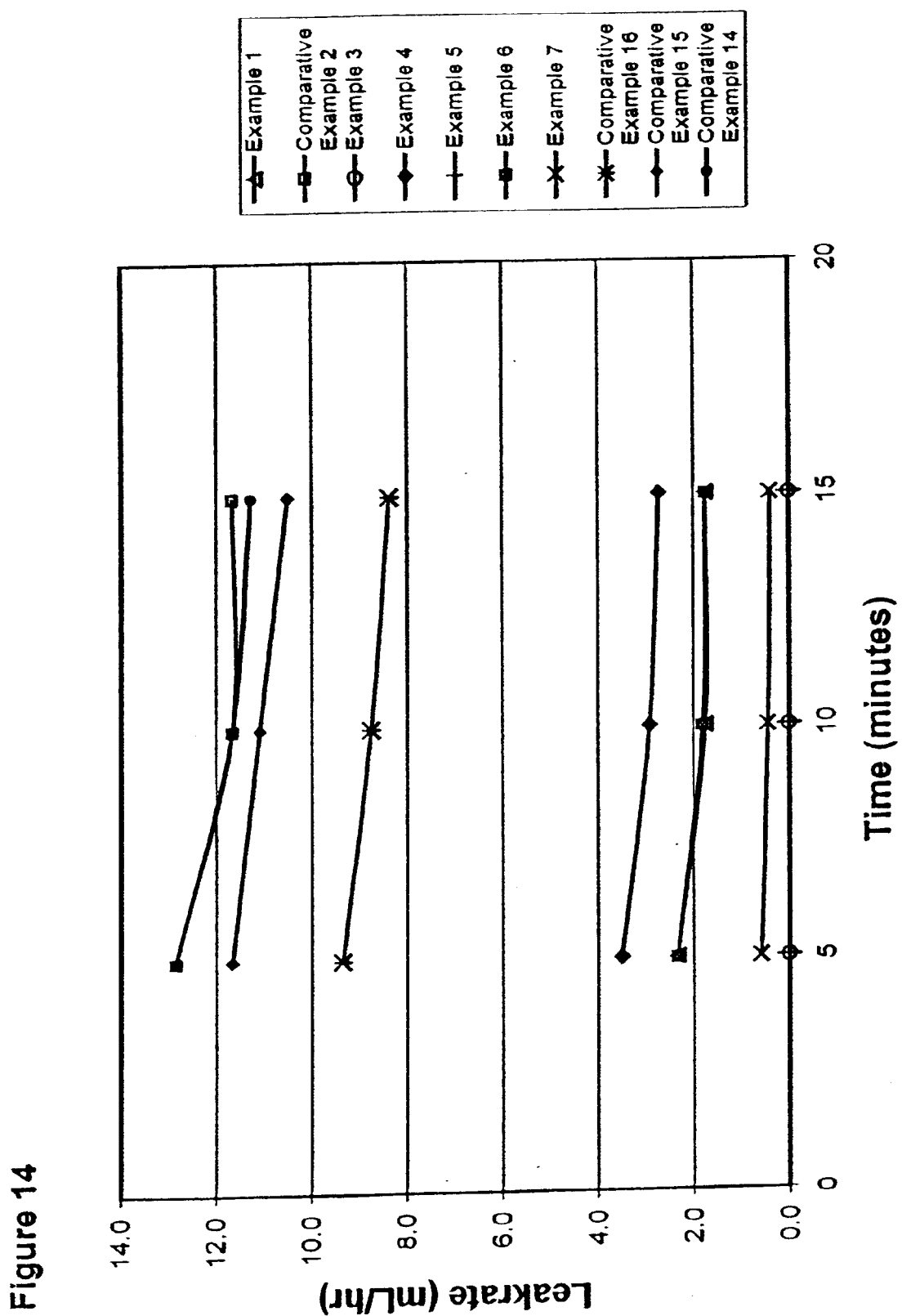
FIG. 14 is a graphical display of results from testing performed on the exemplary embodiments of the present invention.

In observing the inventive gaskets of Examples 1, 3, 4 and 7 it can also be seen in FIG. 14 that the leak rate decreased with increase in thickness of the full density ePTFE substantially air impermeable layers 14. In comparing these inventive gaskets of Examples 1, 3, 4 and 7 to each other, they all have the same inner and outer diameter dimensions with the same location of the substantially air impermeable region 13. The substantially air impermeable layers 14 are all full density expanded PTFE. The differences between them are the thickness levels of the substantially air impermeable layers 14, with the thicker substantially air impermeable layers 14 being more highly air impermeable than the thinner substantially air impermeable layers 14.

Figure 15:
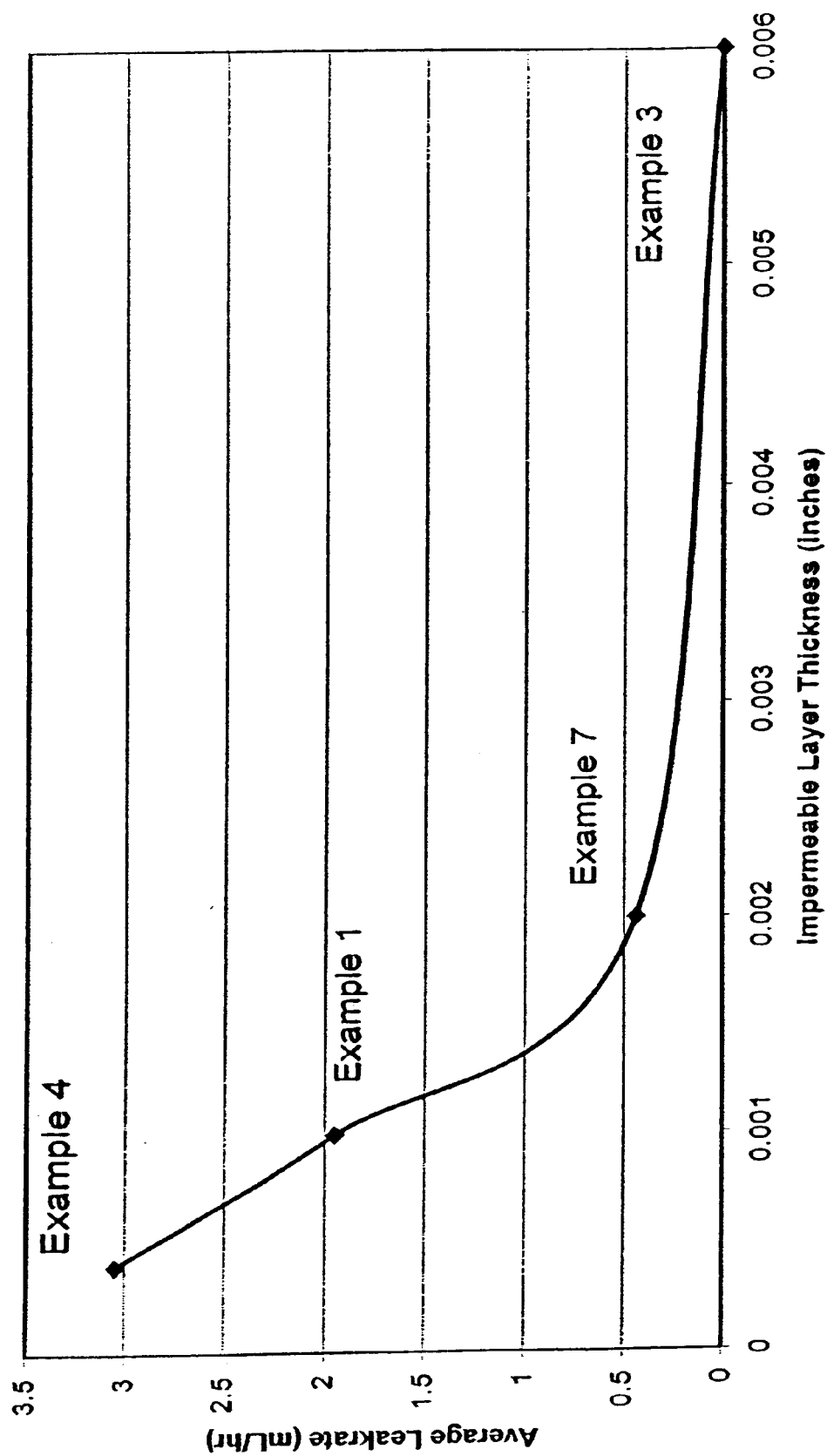
FIG. 15 is a graphical display of results from testing performed on the exemplary embodiments of the present invention.

This conclusion is further illustrated in FIG. 15 where the average leak rate is plotted versus thickness of the substantially air impermeable full density expanded PTFE layers 14. The average leak rate was calculated from the average of the five-minute, ten-minute and fifteen-minute calculated leak rates and is included in Table I. The graphed data in FIG. 15 is from Examples 1, 3, 4 and 7.

TABLE 1

| | Example 1 | | | | Comparative Example 2 | | | | Example 3 | | |
|---|---|---|---|---|---|---|---|---|---|---|---|
| Reading | Time (min) | Manometer Reading (inches) | LeakRate (mL/hr) | Reading | Time (min) | Manometer Reading (in H2O) | LeakRate (mL/hr) | Reading | Time (min) | Manometer Reading (inches) | LeakRate (mL/hr) |
| 1 | 5 | 0.2 | 2.33 | 1 | 5 | 1.1 | 12.84 | 1 | 5 | 0 | 0.00 |
| 2 | 10 | 0.3 | 1.75 | 2 | 10 | 2.0 | 11.67 | 2 | 10 | 0 | 0.00 |
| 3 | 15 | 0.45 | 1.75 | 3 | 15 | 3.0 | 11.67 | 3 | 15 | 0 | 0.00 |
| | | Average Leak Rate: | 1.95 | | | Average Leak Rate: | 12.06 | | | Average Leak Rate: | 0.00 |
| | Example 4 | | | | Example 5 | | | | Example 6 | | |
| Reading | Time (min) | Manometer Reading (inches) | LeakRate (mL/hr) | Reading | Time (min) | Manometer Reading (inches) | LeakRate (mL/hr) | Reading | Time (min) | Manometer Reading (in H2O) | LeakRate (mL/hr) |
| 1 | 5 | 0.3 | 3.50 | 1 | 5 | 0 | 0.00 | 1 | 5 | 0.2 | 2.33 |
| 2 | 10 | 0.5 | 2.92 | 2 | 10 | 0 | 0.00 | 2 | 10 | 0.31 | 1.81 |
| 3 | 15 | 0.7 | 2.72 | 3 | 15 | 0 | 0.00 | 3 | 15 | 0.45 | 1.75 |
| | | Average Leak Rate: | 305 | | | Average Leak Rate: | 0.00 | | | Average Leak Rate: | 1.96 |
| | | | | | Example 7 | | | | Comparative Example 16 | | |
| | | | | Reading | Time (min) | Manometer Reading (in H2O) | LeakRate (mL/hr) | Reading | Time (min) | Manometer Reading (inches) | LeakRate (mL/hr) |
| | | | | 1 | 5 | 0.05 | 0.58 | 1 | 5 | 0.8 | 9.34 |
| | | | | 2 | 10 | 0.075 | 0.44 | 2 | 10 | 1.5 | 8.75 |
| | | | | 3 | 15 | 0.1 | 0.39 | 3 | 15 | 2.15 | 8.36 |
| | | | | | | Average Leak Rate: | 0.47 | | | Average Leak Rate: | 8.82 |
| | | | | | Comparative Example 15 | | | | Comparative Example 14 | | |
| | | | | | Time | Manometer Reading | LeakRate | | Time | Manometer Reading | LeakRate |

TABLE 1-continued

| Reading | (min) | (inches) | (mL/hr) | Reading | (min) | (in H2O) | (mL/hr) |
|---|---|---|---|---|---|---|---|
| 1 | 5 | 1 | 11.67 | 1 | 5 | 1.1 | 12.84 |
| 2 | 10 | 1.9 | 11.09 | 2 | 10 | 2.0 | 11.67 |
| 3 | 15 | 2.7 | 10.50 | 3 | 15 | 2.9 | 11.28 |
| | | Average Leak Rate: | 11.09 | | | Average Leak Rate: | 11.93 |

Sealability Test 2

This sealability test was conducted exactly like Sealability Test 1 above except the gasket stress was selected to be 6.9 MPa (1000 psi) instead of 10.3 MPa (1500 psi). The test fluid, again, was air at 0.62 MPa (90 psi). In this test, the manometer readings were taken at various time intervals for the different gaskets up to 60 minutes.

Figure 18:
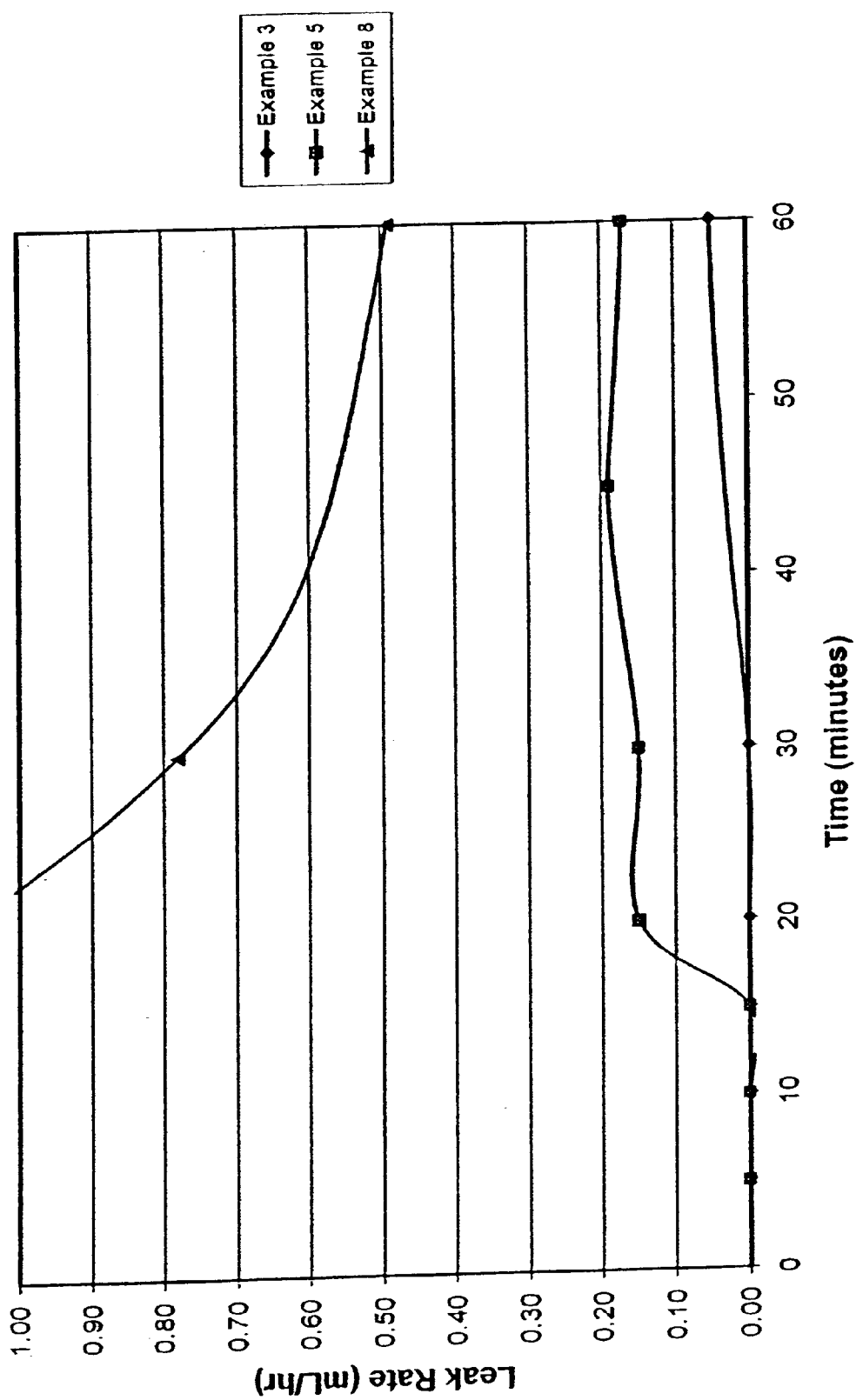
FIG. 18 is a graphical display of results from testing performed on the exemplary embodiments of the present invention.

This sealability test was conducted on Examples 3, 5 and 8 with the results shown in Table II below. These results are also graphed in FIG. 18. This test was conducted to compare the different inventive constructions shown in FIGS. 1–9 where the gaskets had the same thickness full density ePTFE substantially air impermeable layers 14. The difference in gaskets being tested was the location of the air impermeable region 13.

It can be seen from the graph that the lowest leak rate (best performance) was achieved by Example 3, representing the inventive embodiment shown in FIGS. 1–3. This gasket had the air impermeable region located between the inner and outer diameter of the gasket. It is believed that a desired advantage in this embodiment is that upon migration of fluid into the expanded PTFE layer 15 of first chamber 11, and upon subsequent blockage of further fluid permeation by substantially air impermeable region 13, the fluid that is "trapped" in first chamber 11 exerts an outward force against substantially air impermeable layers 14. It is believed that this phenomenon helps to further conform and seal substantially air impermeable layers 14 to the surfaces of the flanges, thereby improving the seal by gasket 10. Without being limited by theory, it is believed that second chamber 12 helps to provide a resistant force behind substantially air impermeable region 13 that helps prevent rupture of substantially air impermeable region 13.

The second lowest leak rate was achieved by Example 5, representing the inventive gasket shown in FIGS. 4–6. This gasket had the substantially air impermeable region 13 located at the inner diameter of the gasket. The third lowest leak rate was achieved by Example 8, representing the inventive gasket shown in FIGS. 7–9. This gasket had the substantially air impermeable region 13 located at the outer diameter of the gasket.

TABLE II

| Reading | Time (min) | Manometer Reading (inches) | LeakRate (mL/hr) |
|---|---|---|---|
| Example 5 | | | |
| 1 | 5 | 0.00 | 0.00 |
| 2 | 10 | 0.00 | 0.00 |
| 3 | 15 | 0.00 | 0.00 |
| 4 | 20 | 0.05 | 0.15 |
| 5 | 30 | 008 | 0.15 |
| 6 | 45 | 0.15 | 0.19 |
| 7 | 60 | 0.18 | 0.17 |
| | | Average Leak Rate: | 0.09 |
| Example 3 | | | |
| 1 | 5 | 0.00 | 0.00 |
| 2 | 10 | 0.00 | 0.00 |
| 3 | 15 | 0.00 | 0.00 |
| 4 | 20 | 0.00 | 0.00 |
| 5 | 30 | 0.00 | 0.00 |
| 6 | 60 | 0.05 | 0.05 |
| | | Average Leak Rate: | 0.01 |
| Example 8 | | | |
| 1 | 5 | 0.30 | 3.50 |
| 2 | 10 | 0.30 | 1.75 |
| 3 | 15 | | |
| 4 | 20 | | |
| 5 | 30 | 0.40 | 0.78 |
| 6 | 60 | 0.50 | 0.49 |
| | | Average Leak Rate: | 1.63 |

Sealability Test 3 (Bubble test)

Figure 16:
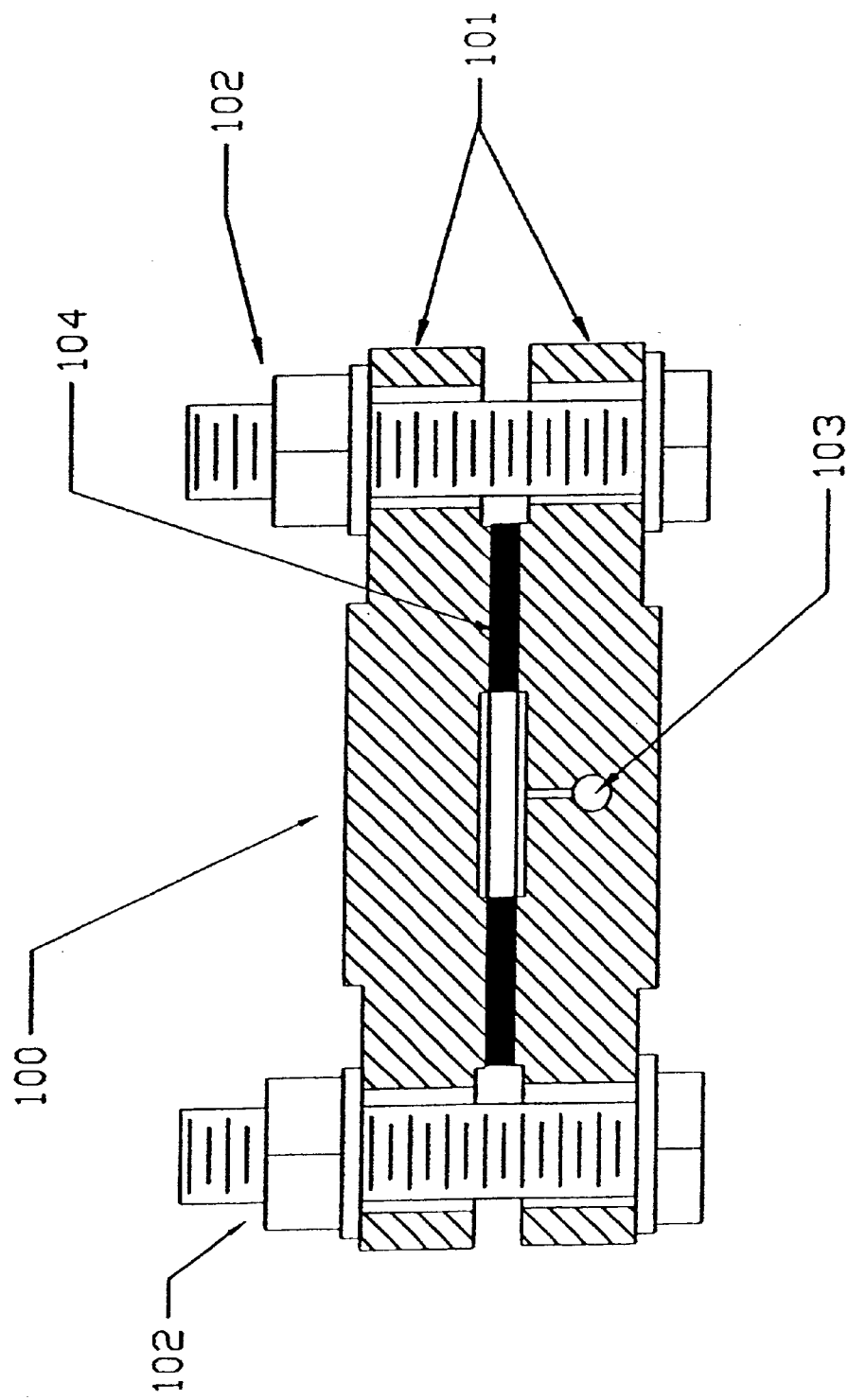
FIG. 16 is a side cross-sectional view of a test fixture used to determine sealability of the exemplary embodiments of the present invention.

Another type of sealability test, representing what is known in the industry as a "bubble test", was performed which involved checking for air leakage from a gasketed piping flange using soapy water. A cross sectional view of the bubble test fixture used to perform this test is shown in FIG. 16. The bubble test results are shown in Table III below. The test fixture 100 consists of a set of 2-inch×150 lb class blind steel flanges 101 having a surface finish of RMS 32, tightened together with four ⅝ inch bolts 102. In one of the flanges 101 an air inlet port 103 is drilled such that an air inlet connecting means can be attached to pressurize the assembly from the internal diameter of the tested gasket. In this test, the gasket 104 to be tested was placed between the flanges 101 of the test fixture 100. The lubricated bolts 102 were tightened in a crossing type pattern (such as 12:00–6:00–3:00–9:00) in three evenly divided incremental steps to the desired torque level. The following equations were used to convert torque levels to gasket stress.

Torque (ft-lbs)=$F_p*K*D/12$

Where:
Fp is force applied by each bolt (lbs)
K is nut factor (assumed to be 0.2)
D is diameter of bolt (in)

Gasket stress (psi)=$F_p*$ number of bolts/contact area of gasket (in$^2$)

This gasket stress (psi) can be further converted to units of (MPa) using the following equation:

Gasket stress (MPa)=gasket stress (psi) * 0.00689476

Ten minutes after reaching the first level of gasket stress (250 psi) or (1.72 MPa) the tightened gasket/flange assembly was then pressurized at the first desired constant air pressure (30 psi) or (0.21 MPa). The gasket/flange assembly was then sprayed with a soapy water solution. The gasket/flange assembly was then visually checked for bubbles appearing in the soapy water along the outer diameter of the gasket 104 indicating air leakage. If a leak is present, the soapy water bubbles will appear, indicating the transmission of air passing around and/or through the gasket 104. After determining whether or not there were air bubbles present, the internal air pressure was increased to the next level (60 psi) or (0.41 MPa). Again, after determining whether or not there were air bubbles present at this pressure level, the internal air pressure was increased to the final level (90 psi) or (0.62 MPa), where once again it was determined whether or not air bubbles were present. The internal air pressure was then released.

The flange/gasket assembly was then tightened to the next level (500 psi) or (3.45 MPa) in three evenly divided increments as done before in a crossing type pattern. The bubble test was then conducted as explained above for each internal air pressure level, with the only difference being there was a fifteen minute wait before applying the first internal air pressure level instead of a ten minute wait.

This procedure was repeated for each gasket stress level shown in Table Ill using the fifteen-minute waiting period.

This bubble test was conducted on gaskets from Comparative Example 9 and Examples 10 and 11. The results are shown in Table III. The test results demonstrate the improved sealability of the inventive gaskets from Examples 10 and 11 over that of the conventional microporous expanded PTFE gasket represented by the GORE-TEX GR® sheet gasketing gasket from Comparative Example 9 as evidenced by the absence of any air bubbles in any of the test conditions for the inventive gaskets. The conventional microporous expanded PTFE gasket showed bubbles, indicating leakage in all of the tested conditions. In looking at the boundary conditions of the test, while the conventional gasket showed leakage at the least demanding test condition (30 psi (0.21 MPa) internal pressure at a gasket stress of 1500 psi (10.34 MPa)), the inventive gaskets showed no leakage at even the most demanding test condition (90 psi (0.62 MPa) internal pressure at a gasket stress of only 250 psi (1.72 MPa)). This demonstrates a vast improvement of sealability at low gasket stresses over the conventional microporous expanded PTFE gasket.

TABLE III

| Gasket Stress | | Torque | | Bubbles Detected (Yes or No) | | |
|---|---|---|---|---|---|---|
| | | | | Air Pressure 30 psi | 60 psi (0.41 | 90 psi (0.62 |
| (psi) | (MPa) | (ft lb) | (N m) | (0.21 MPa) | MPa) | MPa) |
| Comparative Example 9 | | | | | | |
| 250 | 1.72 | 3 | 4 | YES | YES | YES |
| 500 | 3.45 | 6 | 8 | YES | YES | YES |
| 1000 | 6.89 | 11 | 15 | YES | YES | YES |
| 1500 | 10.34 | 17 | 23 | YES | YES | YES |
| Example 10 | | | | | | |
| 250 | 1.72 | 3 | 4 | NO | NO | NO |
| 500 | 3.45 | 6 | 8 | NO | NO | NO |
| 1000 | 6.89 | 11 | 15 | NO | NO | NO |
| 1500 | 10.34 | 17 | 23 | NO | NO | NO |
| Example 11 | | | | | | |
| 250 | 1.72 | 3 | 4 | NO | NO | NO |
| 500 | 3.45 | 6 | 8 | NO | NO | NO |
| 1000 | 6.89 | 11 | 15 | NO | NO | NO |
| 1500 | 10.34 | 17 | 23 | NO | NO | NO |

Air Permeability Test 4

Figure 17:
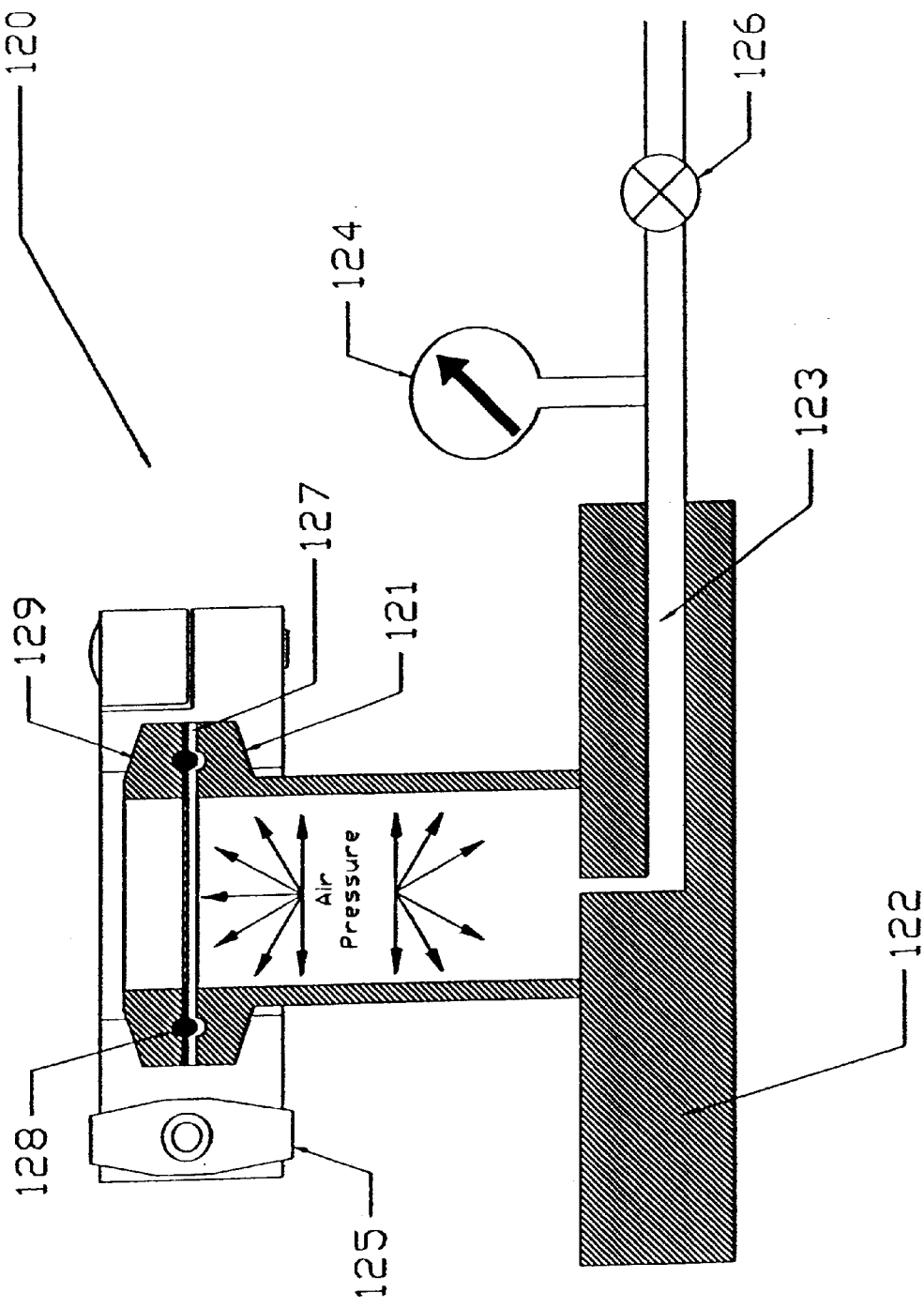
FIG. 17 is a side cross-sectional view of a test apparatus used to measure air permeability on the exemplary embodiments of the present invention.

As a means of measuring the air permeability level, and consequently air impermeability level, of various film or sheet materials, a test fixture having an overall internal air volume of 50 cc was constructed. This air impermeable test fixture is shown in FIG. 17. The air permeability test fixture 120 was created using a 1.5 inch (3.81 cm) diameter sanitary flange ferrule 121. The ferrule 121 was cut to a length of 5.2 cm and welded to a stainless steel base 122. A hole 123 was drilled through the base for connection to a pressurized air source and pressure measurement instrumentation. All components of the test fixture 120 were connected using ⅛ inch tubing and compression fittings. A digital manometer 124 (350 Smart Manometer commercially available from Meriam Instrument of Cleveland, Ohio) was used to accurately measure pressure. A regulated air supply was used to pressurize the test fixture to the proper starting pressure. A shut off valve 126, connected with compression fittings, was used to block airflow to or from the test fixture once the desired internal pressure was achieved. The overall internal air volume of the test fixture 120 was based on the internal air volume of the fixture 120 including the volume associated with fittings and tubing sections between the shut-off valve 126 and the interior of the flange ferrule 121. The total fixture volume (chamber +volume in tubing and fittings) was calculated to be 50 cubic centimeters (±0.5 cc).

To test a film or sheet sample 127, the sample 127 was cut into a circle having a diameter of 5.1 mm (2.0 inches). The film 127 was placed over the opening of the sanitary flange ferrule 121. A 1.5 inch (3.81 cm) diameter screened EPDM gasket 128, having a stainless steel screen with a mesh size of 40 bounded around the perimeter by EPDM rubber commercially available from Rubberfab Mold and Gasket Co. of Andover, N.J., under part number 4'MP-ES150, was placed on top of the test sample 127 to serve as a backing to keep the test film 127 from distending and/or bursting during the test. A 1.5 inch (3.81 cm) short weld sanitary flange ferrule 129 was placed on top of the screened EPDM gasket 128 and the sanitary flange clamp 125 was tightened into place, creating a seal between the flange ferrule 121, the film sample 127, the screened EPDM gasket 128, and the short weld sanitary flange ferrule 129. The regulated air supply connected to the valve 126 was used to create the initial internal pressure of the test fixture 120. The fixture 120 was pressurized to a pressure of 50.0 kPa and the valve 126 was closed. A stopwatch was used to measure the time required for the pressure within the test fixture 120 to drop from 50.0 kPa to 10.0 kPa as a result of air permeation through the film test sample 127. For highly impermeable film samples (where the internal fixture pressure requires greater than ten minutes to fall from 50.0 kPa to 10.0 kPa) the pressure was recorded after 10 minutes. Table IV below shows the air impermeability results using the test procedures described above for various film type samples. Three test samples were made and tested for each film type sample. The following film type samples were tested.

Film Type Sample A—The 0.01 mm (0.0004 in) thick non-porous (full density) expanded PTFE film was produced by peeling one of the non-porous expanded PTFE outer layers from the sheet that was cut from the mandrel in Example 4. Three circles having a diameter of 5.1 mm were cut from this film to produce the test samples.

Film Type Sample B—The 0.025 mm (0.001 in) thick non-porous (full density) expanded PTFE film was produced by peeling one of the non-porous expanded PTFE outer layers from the sheet that was cut from the mandrel in Example 1. Three circles having a diameter of 5.1 mm were cut from this film to produce the test samples.

Film Type Sample C—The 0.05 mm (0.002 in) thick non-porous (full density) expanded PTFE film was produced by peeling one of the non-porous expanded PTFE outer layers from the sheet that was cut from the mandrel in Example 7. Three circles having a diameter of 5.1 mm were cut from this film to produce the test samples.

Film Type Sample D—The 0.15 mm (0.006 in) thick non-porous (full density) expanded PTFE film was produced by peeling one of the densified expanded PTFE outer layers from the previously peeled sheet generated in Example 3. Three circles having a diameter of 5.1 mm were cut from this film to produce the test samples.

Film Type Sample E—The 0.051 mm thick skived PTFE was from the commercially available skived PTFE film from Example 17. Three circles having a diameter of 5.1 mm were cut from this film to produce the test samples.

Film Type Sample F—The 0.051 mm thick PFA film was from the commercially available PFA film from Example 18. Three circles having a diameter of 5.1 mm were cut from this film to produce the test samples.

Film Type Sample G—The 0.013 mm thick PFA film was obtained and is commercially available from E.I. du Pont de Nemours, Inc., of Wilmington, Del., under part number 50OLP high performance PFA film. Three circles having a diameter of 5.1 mm were cut from this film to produce the test samples.

Film Type Sample H—The 0.038 mm thick microporous expanded PTFE film was from the second continuous microporous expanded PTFE sheet produced in Example 1. Three circles having a diameter of 5.1 mm were cut from this film to produce the test samples.

Film Type Sample I—The 3.2 mm thick GORE-TEX® GR Sheet was from the commercially available GORE-TEX® GR Sheet gasketing from Comparative Example 14. This is a microporous expanded PTFE sheet gasketing material. Three circles having a diameter of 5.1 mm were cut from this film or sheet to produce the test samples.

Film Type Sample J—The 1.0 mm thick GORE-TEX® GR Sheet was obtained and is commercially available from W. L. Gore and Associates, Inc. This is a microporous expanded PTFE sheet gasketing material. Three circles having a diameter of 5.1 mm were cut from this film or sheet to produce the test samples.

Film Type Sample K—The 2.3 mm thick microporous expanded PTFE film was produced by peeling the outer full density expanded PTFE layers from the previously peeled sheet of Example 3. Thus, the only portion remaining from the GORE-TEX GR® Style R sheet gasketing was the center layer 42 of conformable microporous expanded PTFE material. Three circles having a diameter of 5.1 mm were cut from this microporous expanded PTFE material to produce the test samples.

Film Type Sample L—The 3.0 mm thick microporous expanded PTFE film was produced by peeling the outer full density PTFE layers from the sheet which was cut from the mandrel in Example 1, leaving the inner microporous expanded PTFE layer. Three circles having a diameter of 5.1 mm were cut from this microporous expanded PTFE film (layer) to produce the test samples.

TABLE IV

| Film Type Sample | Film Sample Construction | Test Sample | Time for Test Completion (seconds) |
|---|---|---|---|
| A | Full density expanded PTFE 0.01 mm thickness | 1 | 6.9 |
| | | 2 | 6.9 |
| | | 3 | 6.6 |
| B | Full density expanded PTFE 0.025 mm thickness | 1 | 31.7 |
| | | 2 | 41.7 |
| | | 3 | 38.5 |
| C | Full density expanded PTFE 0.05 mm thickness | 1 | 119.6 |
| | | 2 | 109.3 |
| | | 3 | 108.0 |
| D | Full density expanded PTFE 0.15 mm thickness | 1 | 600* (49.9 kPa) |
| | | 2 | 600* (49.9 kPa) |
| | | 3 | 600* (49.9 kPa) |
| E | Skived PTFE 0.051 mm thickness | 1 | 600* (49.9 kPa) |
| | | 2 | 600* (49.8 kPa) |
| | | 3 | 600* (49.8 kPa) |
| F | PFA film 0.051 mm thickness | 1 | 600* (49.9 kPa) |
| | | 2 | 600* (49.9 kPa) |
| | | 3 | 600* (49.8 kPa) |
| G | PFA film 0.013 mm thickness | 1 | 600* (49.9 kPa) |
| | | 2 | 600* (49.9 kPa) |
| | | 3 | 600* (49.9 kPa) |
| H | Microporous expanded PTFE 0.038 mm thickness | 1 | 0.5 |
| | | 2 | 0.4 |
| | | 3 | 0.5 |
| I | Microporous expanded PTFE 3.2 mm thickness | 1 | 5.5 |
| | | 2 | 5.5 |
| | | 3 | 5.5 |
| J | Microporous expanded PTFE 1.0 mm thickness | 1 | 1.9 |
| | | 2 | 1.8 |
| | | 3 | 1.8 |
| K | Microporous expanded PTFE 2.29 mm thickness | 1 | 3.4 |
| | | 2 | 3.5 |
| | | 3 | 3.5 |
| L | Microporous expanded PTFE 3.0 mm thickness | 1 | 5.6 |
| | | 2 | 5.5 |
| | | 3 | 5.3 |

From observing the test results it can be seen that all of the represented materials used in the inventive examples for substantially air impermeable layers 14 were more air impermeable than the materials used representing the microporous expanded PTFE inner layer 15. This is evident because of the longer amount of time it took the film type samples representing the substantially air impermeable layers 14 to drop from 50.0 kPa to 10.0 kPa as compared to those film type samples representing the microporous expanded PTFE inner layer 15. Film type samples A through G represented the different materials used in the inventive example as substantially air impermeable layer 14. Film type samples K and L represented the different materials used in the inventive example as microporous expanded PTFE inner layer 15. Film type sample H represented a single layer of the microporous expanded PTFE film which was used to generate the microporous expanded PTFE inner layer 15 of some of the inventive examples. Film type examples I and J represented commercially available microporous expanded PTFE sheet gasketing.

It can also be seen from these results that within the groupings of similar materials that are differentiated by their thickness levels, the thicker the material, the more air impermeable it becomes, as evident by the longer time it takes for the pressure level to drop. In comparing the different levels of thickness of the similar densified expanded PTFE materials of Film Type Samples A, B, C and D, the increasing level of thickness of the material showed an increasing level of air impermeability. In comparing the different levels of thickness of the similar microporous expanded PTFE materials of Film Type Samples H, I, J, K, and L, once again, the thicker the material, the more air impermeable it was. The only case in which thickness level did not show a difference with similar materials was with the two PFA film samples of Film Type Sample F and G which were both extremely air impermeable in that after the 600 seconds (ten minutes) the air pressure had only dropped from 50 kPa to 48.8–49.9 kPa.

It can also be seen from these results that the film type samples representing the materials used in the inventive examples as the substantially air impermeable layers 14 (Film Type Samples A–F) were all much thinner than the film type samples representing the materials used as the microporous expanded PTFE inner layer 15 (Film Type Samples K and L). As previously mentioned, it can be advantageous to use materials which are highly air impermeable at relatively low levels of thickness to enhance the conformability of the final gasket. Thus, it is demonstrated that full density expanded PTFE, PFA films, and skived PTFE are all materials that can be effectively used as the substantially air impermeable layer 14.

By combining the results from Sealability Test 1 and the results from this test, It has been further demonstrated that materials with results in this test of equal to or greater than 6.9 seconds can be useful as an air impermeable layer 14. It has also been shown that materials with results in this test greater than 30 seconds can be even more effective as an air impermeable layer 14. It has also been shown that materials with results in this test greater than 100 seconds can be still more effective as an air impermeable layer 14. It has further been shown that materials with results in this test greater than 600 seconds can be most effective as an air impermeable layer 14.

Liquid Permeability Test 5

Figure 21:
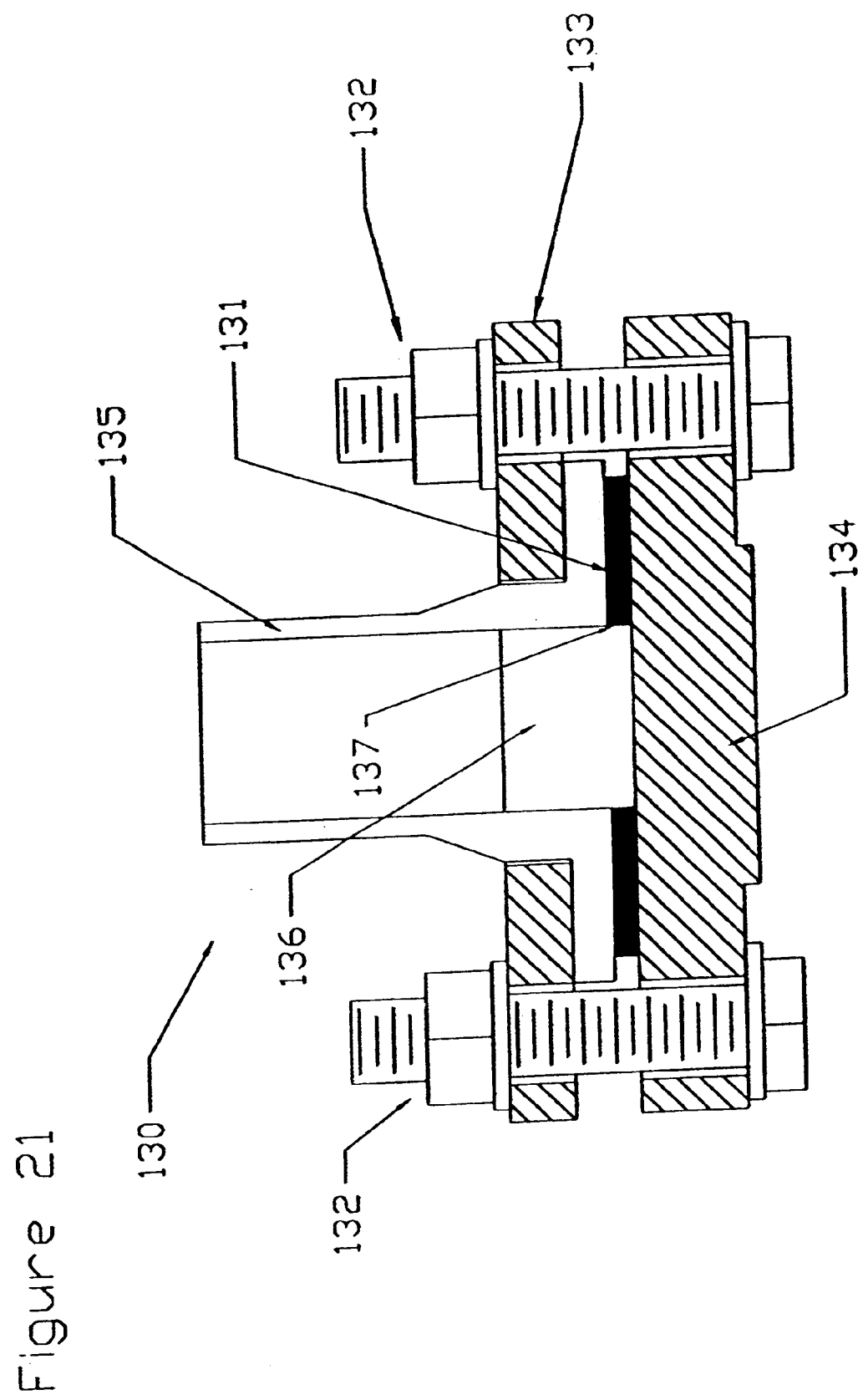
FIG. 21 is a side cross-sectional view of a test apparatus used to measure liquid permeability on the exemplary embodiments of the present invention.

This test was performed to measure the permeation of a solvent-based ink into and through the cross section of a gasket. The ink test fixture 130 shown in FIG. 21 consists of a 3 inch×150 lb class PVDF pipe flange 135 with back up ring 133, a blind 3 inch×150 lb class FRP flange 134 tightened together with four lubricated ⅝ inch bolts 132. In this test the gasket 131 to be tested was placed between the flanges 135 and 134 of the test fixture 130. The bolts were tightened in a crossing type pattern to a torque of 35 ft-lbs (47.5 N-m). An ethyl alcohol based red ink 136, part number 1300-RD Red Ink commercially available from Imaje Ink Jet Printing Corp. Smyrna, Ga., was poured in the throat of the PVDF pipe flange 135 to a depth of approximately 25 mm. The ink 136 was in contact with the inner diameter 137 of the gasket 131 and allowed to soak for the duration of the test. After the specified time the ink 136 was poured from the test fixture 130. The test fixture 130 was disassembled and the gasket 131 was removed. The gasket 131 was allowed to dry for approximately one hour. Once dried the gasket 131 was cut in half down the diameter of the gasket 131. Permeation of the ink 136 was detected by any red staining of the gasket material in its cross section.

This ink test was conducted on the conventional microporous expanded PTFE gasket of Comparative Example 19 and the inventive gaskets of Examples 20 and 21. After 7.5 hours of soaking of the conventional gasket from Comparative Example 19, the ink permeated to a depth of 8.5 mm into the width of the GR sheet gasket cross section (beginning from the exposed internal diameter). After 12 hours of soaking with the inventive gasket of Example 20, there was no permeation of the ink into the gasket cross section. After 14 hours of soaking with the inventive gasket of Example 21, there was no permeation of the ink into the cross section. This demonstrates a vast improvement of the inventive gaskets over the conventional gasket to the resistance to liquid permeation through the gasket.

While particular embodiments of the present invention have been illustrated and described herein, the present invention should not be limited to such illustrations and descriptions. It should be apparent that the changes and modifications may be incorporated and embodied as part of the present invention within the scope of the following claims.

The invention claimed is:

1. A multilayer gasket comprising:
   at least one inner layer of expanded PTFE disposed between a first substantially air impermeable outer layer and
   a second substantially air impermeable outer layer, and
   a substantially air impermeable region bridging said first and second substantially air impermeable layers,
   wherein said gasket is a unitary article.

2. A multilayer gasket as defined in claim 1 wherein said at least one inner layer of expanded PTFE has an inside edge and an outside edge.

3. A multilayer gasket as defined in claim 2 wherein said substantially air impermeable region is disposed on said inside edge.

4. A multilayer gasket as defined in claim 2 wherein said substantially air impermeable region is disposed on said outside edge.

5. A multilayer gasket as defined in claim 2 wherein said substantially air impermeable region is disposed between said inside edge and said outside edge.

6. A multilayer gasket as defined in claim 1 wherein said substantially air impermeable region comprises densified expanded PTFE.

7. A multilayer gasket as defined in claim 1 wherein said substantially air impermeable region comprises expanded PTFE having a structure of interconnected passages and pathways and a filler disposed in at least a portion of said passages and pathways.

8. A multilayer gasket as defined in claim 7 wherein said filler is an elastomer.

9. A multilayer gasket as defined in claim 7 wherein said filler is a fluoroelastomer.

10. A multilayer gasket as defined in claim 7 wherein said filler is a perfluoroelastomer.

11. A multilayer gasket as defined in claim 7 wherein said filler is a perfluoropolyether silicone elastomer.

12. A multilayer gasket as defined in claim 1 wherein said first and second substantially air impermeable layers comprise densified expanded PTFE.

13. A multilayer gasket as defined in claim 1 wherein said first and second substantially air impermeable layers comprise skived PTFE.

14. A multilayer gasket as defined in claim 1 wherein said first and second substantially air impermeable layers comprise PTFE.

15. A multilayer gasket as defined in claim 1 wherein said first and second substantially air impermeable layers are selected from the group consisting of PFA and FEP.

16. A multilayer gasket as defined in claim 1 wherein there are at least two of said inner layers of expanded PTFE and further comprising a substantially air impermeable layer disposed between said at least two inner layers.

17. A multilayer gasket as defined in claim 1 further comprising a plurality of said substantially air impermeable regions.

18. A multilayer gasket comprising
an annular ring having a top surface, a bottom surface, an inside edge, an outside edge and an axis;
a first substantially air impermeable layer disposed on said top surface;
a second substantially air impermeable layer disposed on said bottom surface;
at least one layer of expanded PTFE disposed between said first and second substantially air impermeable layers; and
a substantially air impermeable region bridging said first and second substantially air impermeable layers;
wherein all of said layers are oriented substantially perpendicular to said axis,
wherein said gasket is a unitary article.

19. A multilayer gasket as defined in claim 18 wherein said substantially air impermeable region is disposed on said inside edge of said annular ring.

20. A multilayer gasket as defined in claim 18 wherein said substantially air impermeable region is disposed on said outside edge of said annular ring.

21. A multilayer gasket as defined in claim 18 wherein said substantially air impermeable region is disposed between said inside edge and said outside edge of said annular ring.

22. A multilayer gasket as defined in claim 19 wherein at least one of said first and second substantially air impermeable layers comprise densified expanded PTFE.

23. A multilayer gasket as defined in claim 20 wherein at least one of said first and second substantially air impermeable layers comprise densified expanded PTFE.

24. A multilayer gasket as defined in claim 21 wherein at least one of said first and second substantially air impermeable layers comprise densified expanded PTFE.

25. A multilayer gasket as defined in claim 22 wherein said substantially air impermeable region comprises densified expanded PTFE.

26. A multilayer gasket as defined in claim 23 wherein said substantially air impermeable region comprises densified expanded PTFE.

27. A multilayer gasket as defined in claim 24 wherein said substantially air impermeable region comprises densified expanded PTFE.

28. An annular gasket having an inner perimeter, an outer perimeter, a top surface, and a bottom surface comprising:
a first chamber of expanded PTFE disposed adjacent to said inner perimeter having a first air impermeable top layer on said top surface and a first air impermeable bottom layer on said bottom surface;
a second chamber of expanded PTFE disposed adjacent to said outer perimeter having a second air impermeable top layer on said top surface and a second air impermeable bottom layer on said bottom surface;
a substantially air impermeable region disposed between said first and second chambers,
wherein said gasket is a unitary article.

29. An annular gasket as defined in claim 28 wherein said substantially air impermeable region has a thickness less than a thickness of said first and second chambers.

30. An annular gasket as defined in claim 28 used in a glass-lined steel flange.

31. An annular gasket as defined in claim 28 used in a glass flange.

32. An annular gasket as defined in claim 28 used in a fiberglass reinforced plastic flange.

33. An annular gasket having an inner perimeter, an outer perimeter, a top surface, and a bottom surface comprising:
a first chamber of expanded PTFE disposed adjacent to the inner perimeter having a first top portion on the top surface and a first bottom portion on the bottom surface, wherein said first top portion and said first bottom portion are less permeable to air than said expanded PTFE of said first chamber;
a second chamber of expanded PTFE disposed adjacent to the outer perimeter having a second top portion on the top surface and a second bottom portion on the bottom surface, wherein said second top portion and said second bottom portion are less permeable to air than said expanded PTFE of said second chamber; and
a region disposed between said first and second chambers, said region being less permeable to air than the expanded PTFE of the first and second chambers,
wherein said gasket is a unitary article.

34. An annular gasket having an inner perimeter, an outer perimeter, a top surface, and a bottom surface comprising:
a first chamber of expanded PTFE disposed adjacent to the inner perimeter having a first top barrier on the top surface and a first bottom barrier on the bottom surface;
a second chamber of expanded PTFE disposed adjacent to the outer perimeter having a second top barrier on the top surface and a second bottom barrier on the bottom surface;
a barrier disposed between and connecting said first and second chambers.
wherein said gasket is a unitary article.

35. An annular gasket having an inner perimeter, an outer perimeter, a top surface, and a bottom surface comprising:
a chamber of expanded PTFE having a top portion on the top surface and a bottom portion on the bottom surface, wherein said top portion and said bottom portion are less permeable to air than said expanded PTFE of said chamber;
a region disposed along said inner perimeter between said top portion and said bottom portion with said region having tight contact with said chamber of expanded PTFE, said region being less permeable to air than the expanded PTFE of the chamber,
wherein said gasket is a unitary article.

36. An annular gasket having an inner perimeter, an outer perimeter, a top surface, and a bottom surface comprising:
a chamber of expanded PTFE having a top portion on the top surface and a bottom portion on the bottom surface, wherein said top portion and said bottom portion are less permeable to air than said expanded PTFE of said chamber;
a region disposed along said outer perimeter between said top portion and said bottom portion with said region having tight contact with said chamber of expanded PTFE, said region being less permeable to air than the expanded PTFE of the chamber,
wherein said gasket is a unitary article.

37. An annular gasket having an inner perimeter, an outer perimeter, a top surface, and a bottom surface comprising:
- a first chamber of expanded PTFE having a first top portion on the top surface and a first bottom portion on the bottom surface, wherein said first top portion and said first bottom portion are less permeable to air than said expanded PTFE of said first chamber;
- a second chamber of expanded PTFE having a second top portion on the top surface and a second bottom portion on the bottom surface, wherein said second top portion and said second bottom portion are less permeable to air than said expanded PTFE of said second chamber; and
- a region disposed between said first and second chambers, said region being less permeable to air than the expanded PTFE of the first and second chambers, wherein said gasket is a unitary article.

* * * * *